United States Patent
Yoshihara et al.

(10) Patent No.: US 8,694,689 B2
(45) Date of Patent: Apr. 8, 2014

(54) STORAGE SYSTEM HAVING PLURAL MICROPROCESSORS, AND PROCESSING ALLOTMENT METHOD FOR STORAGE SYSTEM HAVING PLURAL MICROPROCESSORS

(75) Inventors: Tomohiro Yoshihara, Kawasaki (JP); Sadahiro Sugimoto, Yokohama (JP); Norio Shimozono, Machida (JP); Noboru Morishita, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1079 days.

(21) Appl. No.: 12/309,410

(22) PCT Filed: Jan. 9, 2009

(86) PCT No.: PCT/JP2009/000070
§ 371 (c)(1),
(2), (4) Date: Jan. 16, 2009

(87) PCT Pub. No.: WO2010/079535
PCT Pub. Date: Jul. 15, 2010

(65) Prior Publication Data
US 2011/0252262 A1  Oct. 13, 2011

(51) Int. Cl.
*G06F 3/00* (2006.01)
*G06F 15/76* (2006.01)

(52) U.S. Cl.
USPC .................. 710/5; 710/20; 712/42; 712/43

(58) Field of Classification Search
None
See application file for complete search history.

(56) References Cited

U.S. PATENT DOCUMENTS

| | | | | | |
|---|---|---|---|---|---|
| 4,607,364 | A | * | 8/1986 | Neumann et al. | 370/470 |
| 4,700,358 | A | * | 10/1987 | Duncanson et al. | 375/222 |
| 5,339,395 | A | * | 8/1994 | Pickett et al. | 710/305 |
| 5,758,132 | A | * | 5/1998 | Stråhlin | 713/501 |
| 7,840,775 | B2 | | 11/2010 | Shimada | |
| 2005/0021907 | A1 | | 1/2005 | Shimada | |
| 2007/0208848 | A1 | | 9/2007 | Bhesania et al. | |
| 2007/0288701 | A1 | * | 12/2007 | Hofstee et al. | 711/153 |
| 2009/0133021 | A1 | * | 5/2009 | Coulter et al. | 718/102 |

FOREIGN PATENT DOCUMENTS

| | | | |
|---|---|---|---|
| EP | 1 708 077 A1 | 10/2005 | |
| EP | 1 777 614 A1 | 3/2006 | |
| EP | 1 986 090 A2 | 1/2008 | |

(Continued)

OTHER PUBLICATIONS

International Search Report and Written Opinion of PCT/JP2009/000070, mailed on Aug. 6, 2009.

(Continued)

*Primary Examiner* — Kris Rhu
(74) *Attorney, Agent, or Firm* — Stites & Harbison PLLC; Juan Carlos A. Marquez, Esq.; Nicholas B. Trenkle

(57) ABSTRACT

In a storage system which includes a plurality of microprocessors, it is desired to prevent delay in I/O responses due to synchronous processing waiting for asynchronous processing, while still ensuring the throughput of asynchronous processing. In a plurality of microprocessors possessed by a controller, synchronous processors and asynchronous processors are mixed together. The synchronous processors are microprocessors whose duty is to perform synchronous processing and not to perform asynchronous processing. And the asynchronous processors are microprocessors whose duty is to perform asynchronous processing and not to perform synchronous processing.

15 Claims, 20 Drawing Sheets

(56) References Cited

FOREIGN PATENT DOCUMENTS

| JP | 11-502959 A | 3/1999 |
| JP | 2005-44010 | 7/2003 |
| JP | 2004-171172 A | 6/2004 |
| JP | 2008-257572 A | 10/2008 |

OTHER PUBLICATIONS

Office Action issued from the Japanese Patent Office in corresponding Japanese Patent Application No. 2011-514959, dated Jun. 26, 2012, 1. pg.

* cited by examiner

| MP NUMBER (211) | SYNCHRONOUS MP FLAG (212) |
|---|---|
| 0 | 1 |
| 1 | 1 |
| 2 | 0 |
| 3 | 0 |

| STRUCTURE NAME (221) | NUMBER MOUNTED (222) | MAXIMUM NUMBER MOUNTABLE (223) |
|---|---|---|
| port | l | L |
| HDD | m | M |
| MP | n | N |

| RAID LEVEL (231) | SET NUMBER (232) |
|---|---|
| 1 | A |
| 5 | B |
| 6 | C |

| APPLICATION NAME (241) | SET NUMBER (242) |
|---|---|
| ASYNCHRONOUS LOCAL COPIES | P |
| CACHE RESIDENT FUNCTION | Q |

240

| MP NUMBER 251 | UTILIZATION RATE [%] 252 |
|---|---|
| 0 | 50 |
| 1 | 50 |
| 2 | 30 |
| 3 | 30 |

| APPLICATION NAME | SET NUMBER |
|---|---|
| ASYNCHRONOUS LOCAL COPY | P |
| CACHE RESIDENT FUNCTION | Q |
| ASYNCHRONOUS REMOTE COPY | R |

STORAGE SYSTEM HAVING PLURAL MICROPROCESSORS, AND PROCESSING ALLOTMENT METHOD FOR STORAGE SYSTEM HAVING PLURAL MICROPROCESSORS

TECHNICAL FIELD

The present invention generally relates to a storage system which includes a plurality of microprocessors.

BACKGROUND ART

Generally, a storage system includes a plurality of storage devices and a controller which receives I/O (Input/Output) requests from one or more external devices (ex. Host computers). As the structure of the controller, for example, there is the one disclosed in Patent Citation 1.

Patent Citation 1

Japanese Laid-Open Patent Publication 2005-044010.

DISCLOSURE OF INVENTION

Technical Problem

If, for example, the I/O request which has been received from the external device is a read request, then the controller performs processing (storage device read processing) to transfer data from a storage device into a cache memory (CM), and processing (CM read processing) to transfer the data to be transferred, from the CM to the external device.

Furthermore if, for example, the I/O request which has been received from the external device is a write request, then the controller performs processing (CM write processing) to transfer the data which has been received from the external device to the CM, and processing (storage device write processing) to transfer the data from the CM to the storage device.

Although a controller which includes a plurality of microprocessors is per se known, normally, each microprocessor performs both synchronous and asynchronous processing. Here "synchronous processing" means processing which must be executed during the time interval between the receipt of an I/O request from an external device and the returning of a response to the I/O request to the external device—for example, processing such as execution of the previously described storage device read processing, CM read processing, CM write processing, or the like. On the other hand, "asynchronous processing" means specific processing among processing other than synchronous processing (processing which need not be executed f during the time interval between the receipt of an I/O request from an external device and the returning of a response to the I/O request to the external device)—for example, processing such as execution of the previously described storage device write processing.

If some microprocessor takes a long period of time to perform some asynchronous processing which is not important to complete the processing in a short time, the starting of synchronous processing which must be performed by this microprocessor is delayed, and as a consequence the response to an external device becomes delayed, which is undesirable. However, it is not desirable to accord priority to synchronous processing and to delay asynchronous processing for a long time period. The reason why is that, for example, when an attempt is made to perform storage device write processing all at once, then the CM becomes filled up with data, and data corresponding to a write request cannot be written into the CM, so that, as a consequence, if anything, there is a fear that return of a response to an I/O request (hereinafter termed an "I/O response") will be undesirably delayed.

Accordingly, the object of the present invention is, in a storage system having plural microprocessors, to prevent delay to I/O responses due to synchronous processing waiting for asynchronous processing, while still ensuring the throughput for asynchronous processing.

Technical Solution

In the plurality of microprocessors included in the controller, synchronous processors and asynchronous processors are mixed together. A synchronous processor is a microprocessor whose duty is to perform synchronous processing but which is not in charge of asynchronous processing. And an asynchronous processor is a microprocessor whose duty is to perform asynchronous processing but which is not in charge of synchronous processing.

BRIEF DESCRIPTION OF DRAWINGS

FIG. 1 is a structural diagram of a computer system according to a first embodiment of the present invention.
FIG. 2 is a structural diagram of an MPPK according to the first embodiment of the present invention.
FIG. 3 is a structural diagram of a management console according to the first embodiment of the present invention.
FIG. 4 is a figure showing the structure of an MP setting information table according to the first embodiment of the present invention.
[FIG. 5]
FIG. 5 is a figure showing the structure of a storage structure information table according to the first embodiment of the present invention.
[FIG. 6]
FIG. 6 is a figure showing the structure of a RAID management table according to the first embodiment of the present invention.
[FIG. 7]
FIG. 7 is a figure showing the structure of an application setting number table according to the first embodiment of the present invention.
FIG. 8 is a flow chart of I/O processing according to the first embodiment of the present invention.
FIG. 9 is a flow chart of changeover processing according to the first embodiment of the present invention.
FIG. 10 is a flow chart of synchronous processing according to the first embodiment of the present invention.
FIG. 11 is a flow chart of asynchronous processing according to the first embodiment of the present invention.
FIG. 12 is a flow chart of a changeover decision according to the first embodiment of the present invention.

FIG. 13 is a flow chart of processing when adding an MPPK according to the first embodiment of the present invention.

FIG. 14 is a figure schematically showing one example of a problem which can occur when one MP comes to perform both synchronous processing and asynchronous processing.

FIG. 15 is a figure schematically showing an example of an advantageous effect which may be anticipated with the first embodiment of the present invention.

FIG. 16 is a structural diagram of a computer system according to a second embodiment of the present invention.

FIG. 17 is a figure showing the structure of an MP utilization rate table according to this second embodiment of the present invention.

FIG. 18 is a flow chart for a case in which a changeover decision is executed by only single MP, according to the second embodiment of the present invention.

FIG. 19 is a flow chart for a case in which a changeover decision is executed by several MPs, according to the second embodiment of the present invention.

FIG. 20 is a figure showing a first example of a screen which is displayed upon a display unit of a management console, according to the second embodiment of the present invention.

FIG. 21 is a figure showing a second example of a screen which is displayed upon a display unit of a management console, according to the second embodiment of the present invention.

FIG. 22 is a figure showing a third example of a screen which is displayed upon a display unit of a management console, according to the second embodiment of the present invention.

FIG. 23 is a figure showing a fourth example of a screen which is displayed upon a display unit of a management console, according to the second embodiment of the present invention.

FIG. 24 is a structural diagram of a computer system according to a third embodiment of the present invention.

[FIG. 25]

FIG. 25 is a figure showing the structure of an application setting number table according to the third embodiment of the present invention.

FIG. 26 is a flow chart showing asynchronous processing according to the third embodiment of the present invention.

EXPLANATION OF THE REFERENCE SYMBOLS

10 . . . storage system

BEST MODE FOR CARRYING OUT THE INVENTION

Various embodiments of the present invention will now be explained with reference to the drawings. It should be understood that the embodiments explained below are not to be considered as being limitative of the invention, which is defined by the scope of the Claims; moreover, the combination of all of the features explained in the embodiments is not limitative in terms of being essential to the means of solution of this invention. Furthermore while, for the convenience of explanation, various structural elements in the computer systems of the various embodiments are described as only being singular in number, they may actually be plural in number (for example, two in number), in order to provide an increase of reliability.

[Mode for the Invention 1]

Figure 1:
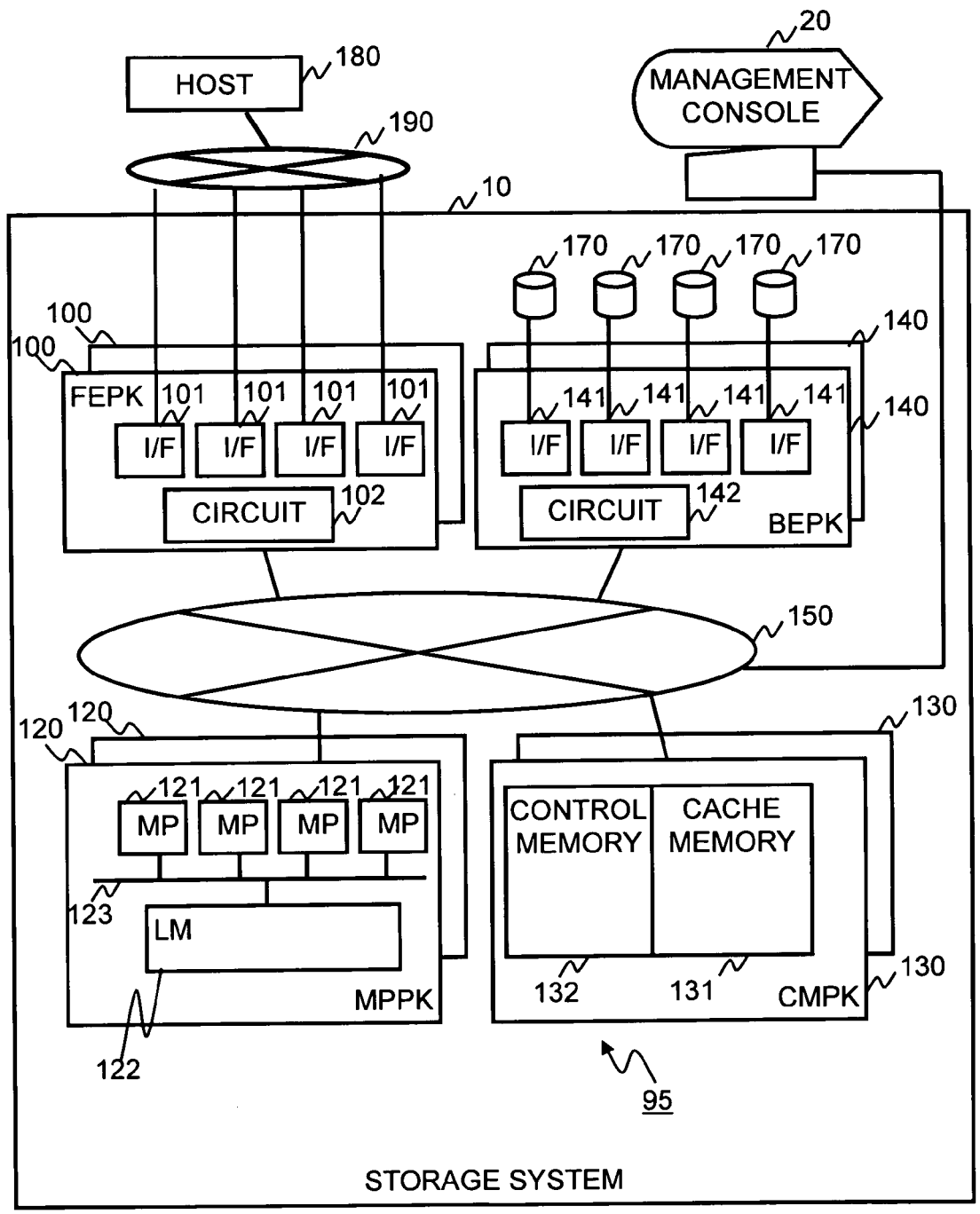
[FIG. 1]

FIG. 1 shows a summary of a computer system according to a first embodiment of the present invention. It should be understood that, in the following explanation, sometimes "interface" is abbreviated as "I/F".

This computer system comprises one or more host computers 180, a storage system 10, and a management console 20. Communication between the host computer 180 and the storage system 10 is performed, for example, via a communication network 190. Any of a SAN (Storage Area Network), a LAN (Local Area Network), the interne, a dedicated circuit, or a public circuit or the like may be employed as the communication network 190, provided that it is capable of performing data communication. Furthermore, among various protocols which are capable of exchanging data, any desired protocol may be adopted as the protocol for communication between the host computer 180 and the storage system 10, such as a fiber channel protocol or the TCP/IP protocol or the like.

The management console 20 is a console for managing the storage system 10.

The host computer 180 transmits an I/O request. This I/O request is, for example, a read request or a write request. The read request includes, for example, the LUN (Logical Unit Number) and the LBA (Logical Block Address) whereby read target data is managed. Furthermore, the write request includes, for example, the LUN and the LBA whereby write target data is written, and the write target data. The LUN is allocated to a logical volume in the storage system 10. And the LBA is an address of a storage region (a block) within this logical volume.

The storage system 10 comprises a plurality of HDD s (Hard Disk Drives, i.e. storage devices) 170, and a controller 95 which accesses any one of the storage devices 170 upon receipt of an I/O request from the host computer 180.

The HDD s 170 are one example of storage devices, and, instead of the HDD s 170, it would also be acceptable to employ some other type of storage devices, for example flash memory devices or the like. A plurality of logical volumes is defined based upon the plurality of HDD s 170. In concrete terms, one or a plurality of RAID (Redundant Array of Independent (or Inexpensive) Disks) groups are provided as being made up from two or more of the HDD s 170, and logical volumes are defined on the basis of these RAID groups. LUNs are allocated to these logical volumes, and access is made from the controller 95 to the HDD 170 upon which is based the logical volume corresponding to the LUN designated by an I/O request. With the Thin Provisioning technique or the like, sometimes the logical volume is a pool volume, and, in this case, the LUN is not allocated to a logical volume which is defined on the basis of a RAID group, but rather the LUN is allocated to a virtual logical volume. In this case, when an I/O request has been received which designates this LUN of a virtual logical volume, access is performed to any one of the pool volumes.

The controller 95 comprises, for example, one or more FEPKs (Front End PacKages) 100 which serve as one or more host I/F units, one or more MPPKs (Micro Processor PacKages) 120 which serve as one or more control units, one or more CMPKs (Cache Memory PacKages) 130 which serve as one or more shared memory units, and one or more BEPKs (Back End PacKages) 140 which serve as one or more disk I/F units. All of these FEKPs 100, MPPKs 120, CMPKs 130, and BEPKs 140 are connected to an internal network 150. This internal network 150 may be, for example, a communication network such as a LAN or the like, or may be a switching device such as a crossbar switch or the like. With this internal network 150, it is possible for the MPs (Micro Processors) 121 of the MPPKs 120 to communicate with any of the FEPKs 100, the CMPKs 130, and the BEPKs 140.

Each of the FEPKs 100 is an interface device for performing communication with the host computer 180, and comprises a plurality of host I/Fs 101 and a transfer control circuit 102. The host I/Fs 101 may, for example, be ports. And the transfer control circuit 102 is a circuit which controls transfer of I/O requests and data and the like which have been received by the host I/Fs 101.

Each of the BEPKs 140 is an interface device for performing communication with the HDD s 170, and comprises a plurality of disk I/Fs 141 and a transfer control circuit 142. The disk I/Fs 141 may, for example, be ports, and, along with being connected to the HDD s via cables, are also connected to the internal network 150, and mediate in processing for transfer of data which is to be the subject of reading or writing between the internal network 150 and the HDD s 170. And the transfer control circuit 142 is a circuit which controls data transfer.

Each of the CMPKs 130 comprises a cache memory (hereinafter abbreviated as "CM") 131 and a control memory 132. The CM 131 and the control memory 132 may be volatile memories, for example DRAM (Dynamic Random Access Memory).

Data to be written to a HDD 170 (in other words, data which is a subject to be written according to a write request from the host computer 180) is temporarily stored in the CM 131, and, moreover, data which has been read out from a HDD 170 (in other words, data which is a subject to be read according to a read request from the host computer 180) is also temporarily stored therein.

The control memory 132 stores control information which is required for processing such as synchronous processing and asynchronous processing and the like, for example HDD structure information (information which specifies which RAID groups are made up from which HDD s 170) and volume management information (information which specifies which logical volume is corresponding to which function and so on) and the like.

The MPPKs 120 control the operation of this storage system 10. Each of the MPPKs 120 comprises a plurality of MPs 121, a local memory (LM) 122, and a bus 123 which connects these together. It should be understood that since, in this embodiment, a plurality of MPs 121 may exist within the storage system 10, accordingly, if a plurality of MPPKs are present, it would be acceptable for only one MP 121 to be present within one MPPK 120.

The LM 122 stores a portion (or the entirety) of the control information which is stored in the control memory 132. By a portion of the control information is meant that portion of the control information which is needed by the MPPK 120 in which the LM 122 is present in which that portion is stored.

Figure 2:
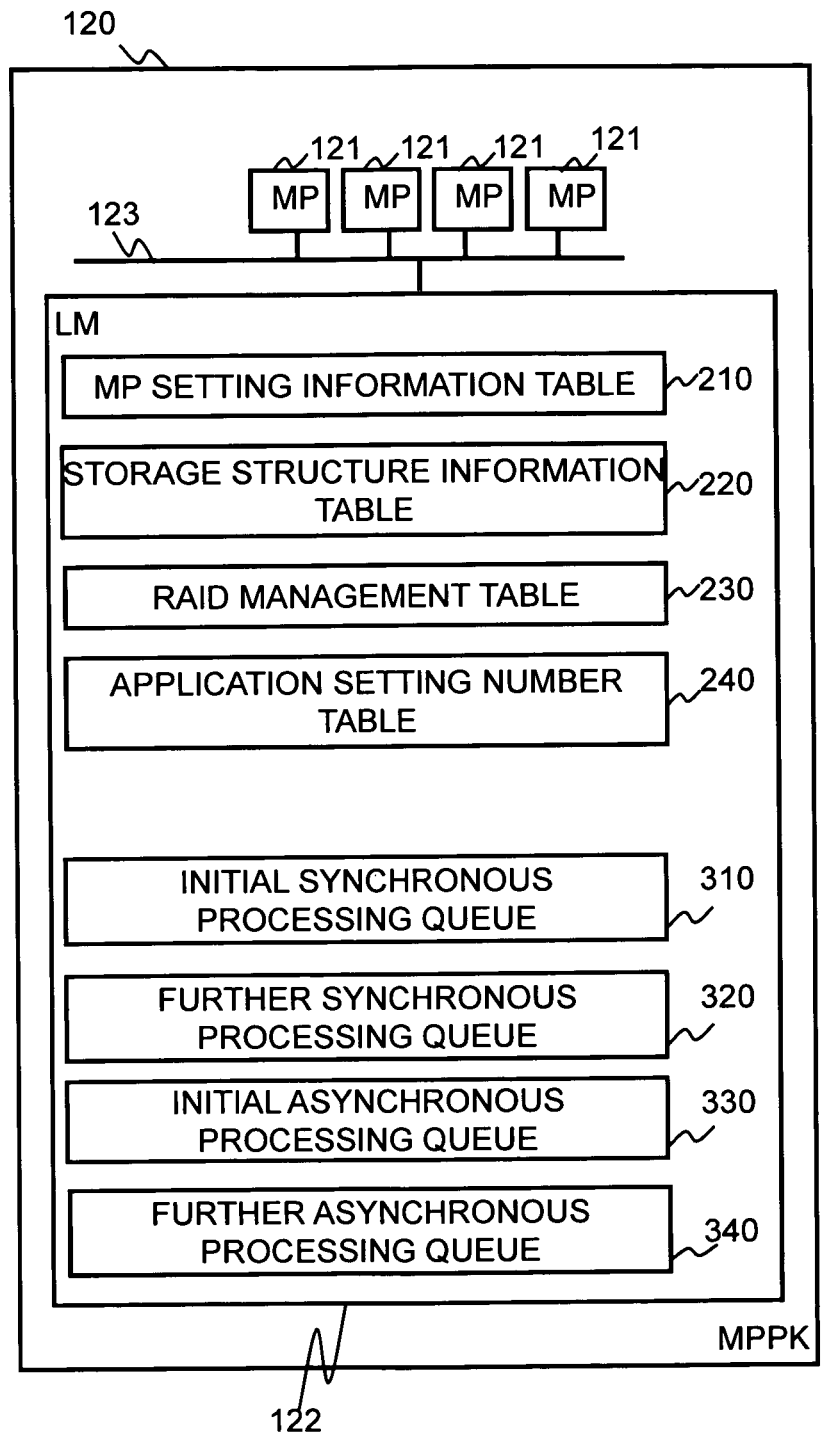
[FIG. 2]

FIG. 2 shows tables and queues in an LM 122 of one of the MPPKs 120.

In this LM 122, there are stored an MP setting information table 210, a storage structure information table 220, a RAID management table 230, an application setting number table 240, an initial synchronous processing queue 310, a further synchronous processing queue 320, an initial asynchronous processing queue 330, and a further asynchronous processing queue 340. In the LM 122, for one MP 120, there are stored one further synchronous processing queue 320 and one further asynchronous processing queue 340. Each of the tables 210 through 240 will be explained in detail hereinafter. Moreover, although this is not specifically shown in the figures, one or more computer programs to be executed by the MPs 121 may also be stored in the LM 122. The processing of FIGS. 8 through 13 is performed by these one or more computer programs being executed. In these one or more computer programs, for example, there may be included a computer program for performing the I/O processing shown in FIG. 8, a computer program for performing the changeover processing shown in FIG. 9, a computer program for performing the synchronous processing shown in FIG. 10, a computer program for performing the asynchronous processing shown in FIG. 11, a computer program for performing the changeover decision processing shown in FIG. 12, and a computer program for performing the processing when adding an MPPK shown in FIG. 13.

Initial synchronous processing requests, which are I/O requests which the host I/Fs 101 have received from the host computer 180, are stored in the initial synchronous processing queue 310. For example, an initial synchronous processing request may be stored in the initial synchronous processing queue 310 by a transfer control circuit 102 which has received an I/O request via a host I/F 101. The transfer control circuit 102 analyzes this I/O request and determines, according to the result of this analysis, in which initial synchronous processing queue 310 of which LM 122 of which MPPK 120 this synchronous processing request (I/O request) is to be stored, and then stores the initial synchronous processing request in that initial synchronous processing queue 310 which has been determined (i.e., distributes it thereinto).

Information related to processing (further synchronous processing) which is performed after initial synchronous processing, for example, completion messages which mean the completion of hardware processing related to synchronous processing (for example, CM read processing or CM write processing), are stored in the further synchronous processing queue 320. For example, an MP (a synchronous MP) 121 may analyze an initial synchronous processing request, and the hardware processing related to synchronous processing may be started if, on the basis of the results of this analysis, data transfer parameters have been set for a specified circuit (for example, a transfer control circuit 102 or 142, or an adapter circuit (a circuit which is provided in a CMPK 130) which controls access to a cache memory 131) (i.e. if initial synchronous processing has been performed). And when, for example, this hardware processing has been completed, a completion message is stored in the further synchronous processing queue 320 which corresponds to the MP 121 for which a data transfer parameter has been set by a specific circuit (for example by a transfer control circuit 102 or 142). This MP 121 executes the further synchronous processing when it has detected that a completion message which is present in the further synchronous processing queue 320 corresponds to that MP 121.

Initial asynchronous processing requests which have become necessary on the basis of the state of the storage system 10 are stored in the initial asynchronous processing queue 330. For example, if some MP (an asynchronous MP)

121 has detected that the ratio of the total amount of data which is not stored upon a HDD 170 to the storage capacity of the CM 131 exceeds a predetermined ratio, then an initial asynchronous processing request may be stored by this MP 121.

Information related to processing (further asynchronous processing) which is performed after initial asynchronous processing, for example, completion messages which mean, the completion of hardware processing related to asynchronous processing (for example, storage device write processing), are stored in the further asynchronous processing queue 340. For example, an MP (an asynchronous MP) 121 may analyze an initial asynchronous processing request, and the hardware processing related to asynchronous processing may be started if, on the basis of the results of this analysis, data transfer parameters have been set for a specified circuit (for example, a transfer control circuit 142, or an adapter circuit which controls access to a cache memory 131) (i.e. if initial asynchronous processing has been performed). And when, for example, this hardware processing has been completed, a completion message is stored in the further asynchronous processing queue 340 which corresponds to the MP 121 for which a data transfer parameter has been set by a specific circuit (for example by a transfer control circuit 142). This MP 121 executes the further asynchronous processing when it has detected that a completion message which is present in the further asynchronous processing queue 340 corresponds to that MP 121.

The MP 121 extracts the requests or information from these queues 310 through 340, and performs processing thereupon.

Figures 3, 4:
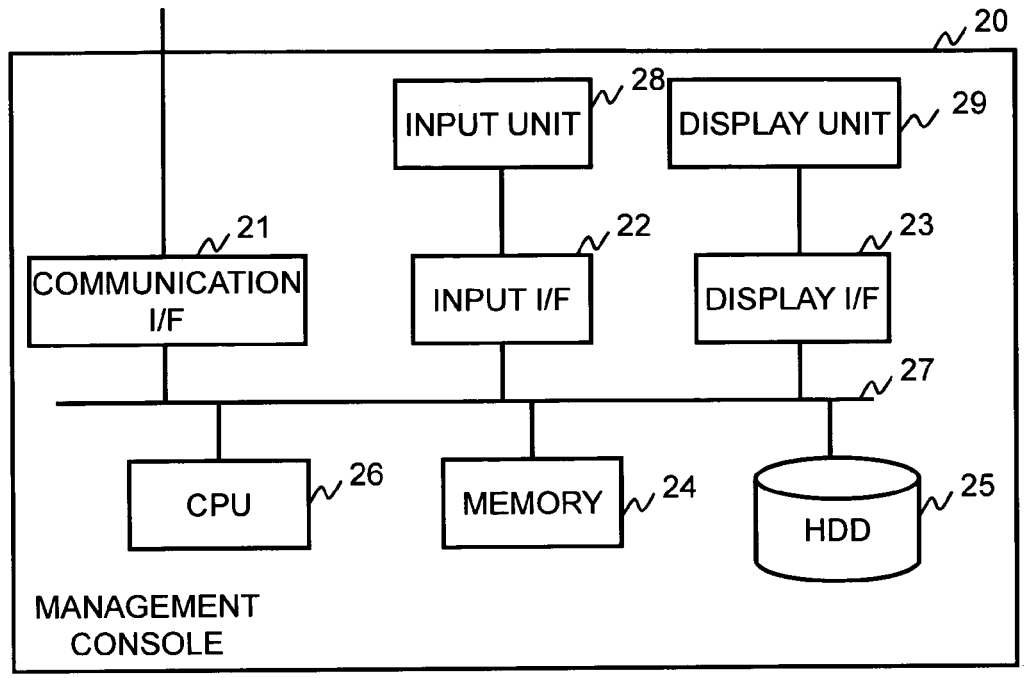
[FIG. 3]
[FIG. 4]

FIG. 3 is a structural diagram of the management console 20.

In this management console 20, a communication I/F 21, an input I/F 22, a memory 24, an HDD 25, and a CPU (Central Processing Unit) 26 are connected via a bus 27.

The memory 24 may include, for example, a ROM (Read Only Memory) and a RAM (Random Access Memory), and stores a boot program and programs which execute various types of processing. Furthermore, this memory 24 is used as a region for storing programs and data, and as a working region for storing data which is used in processing by the CPU 26.

The HDD 25 stores programs and information of various kinds which must be stored even if the power supply is not provided.

For example, the input unit 28 which receives actuation by a user of this management console 20 (i.e. by a manager) (such as, for example, a mouse or a keyboard or the like) is connected to the input I/F 22. This input I/F 22 outputs the signals from the input unit 28 to the CPU 26 as data.

The display I/F 23 is connected, for example, to the display unit 29 (which may, for example, be a liquid crystal display or a CRT (Cathode Ray Tube)). This display I/F 23 may, for example, include a VRAM (Video Random Access Memory), and, under the control of the CPU 26, may create image data according to an image which is to be displayed, and may output various types of control screens to the display unit 29.

The communication I/F 21 is connected to the internal network 150 of the storage system 10, and performs mediation of data exchange between the CPU 26 and various units of the storage system which are connected to the internal network 150 (for example, the MPs 121 of the MPPKs 120).

The CPU 26 controls the operation of the various units 21 through 25. Moreover, the CPU 26 reads out programs which are stored in the memory 24 and/or the HDD 25 into the RAM of the memory 24, and executes them.

The CPU 26 displays various types of image upon the display unit 29 via the display I/F 23.

FIG. 4 shows the structure of the MP setting information table 210.

This MP setting information table 210 is a table which specifies, for each MP, whether it is a synchronous MP or an asynchronous MP. In concrete terms, for example, for each MP, this MP setting information table 210 has an entry which includes a MP number field 211 and a synchronous MP flag field 212.

An MP number, which is an identification number for the MP 121, is stored in the MP number field 211.

A synchronous MP flag is stored in the synchronous MP flag field 212. This synchronous MP flag shows whether the MP which corresponds to this flag is a synchronous MP or an asynchronous MP. A value "1" for this synchronous MP flag means that this is a synchronous MP, while a value "0" means that it is an asynchronous MP. A "synchronous MP" is an MP whose duty is to perform synchronous processing but which is not in charge of asynchronous processing. And an "asynchronous MP" is an MP whose duty is to perform asynchronous processing but which is not in charge of synchronous processing.

FIG. 5 shows the structure of the storage structure information table 220.

This storage structure information table 220 specifies information related to the number of specified structural elements possessed by the storage system 10. In concrete terms, for example, for each structural element, the storage structure information table 220 has an entry which includes a structure name field 221, a number mounted field 222, and a maximum number mountable field 223.

The name of each structural element of the storage system 10 is stored in its structure name field 221.

The number of each structural element mounted is stored in its number mounted field 222.

The maximum number of each structural element which can be mounted in the storage system 10 is stored in its maximum number mountable field 223.

FIG. 6 shows the structure of the RAID management table 230.

This RAID management table 230 specifies how many RAID groups are present at which RAID levels. In concrete terms, for example, for each RAID level, this RAID management table 230 has an entry which includes a RAID level field 231 and a set number field 232.

Information which specifies the RAID level is stored in the RAID level field 231.

And the number of RAID groups (or of HDDs 170) which correspond to each RAID level is stored in the set number field 232.

FIG. 7 shows the structure of the application setting number table 240.

This application setting number table 240 specifies how many HDD s (or logical volume groups and/or logical volumes) which correspond to each application (i.e. function) are present. In concrete terms, for example, for each application possessed by the storage system 10, this application setting number table 240 has an entry which includes an application name field 241 and a set number field 242. Here by "application" is meant a function which is applied to an HDD 170 which is managed within this storage system 10 and which is implemented by an MP 121. Examples are asynchronous local copying, the cache resident function, and so on. "Asynchronous local copying" is a function of, asynchronously with the timing at which I/O requests are received, copying data from one logical volume which makes up a volume pair (the primary logical volume) to the other logical volume (the secondary logical volume). And the "cache resident function" is a function of making data within a logical volume which corresponds to this function (either all of this data, or part of it) always remain present in the CM 131, and accesses to the logical volume which corresponds to this function are completed by access to the CM 131 (however, data in the CM 131 which is not written to the HDD 170 is stored in a timely manner upon the HDD 170 upon which the logical volume which corresponds to this volume is based (for example when the power to the storage system 10 is turned off)).

The name of each application is stored in its application name field 241.

The number of HDD s (or of logical volume groups (volume pairs) and/or logical volumes) which correspond to each application is stored in its set number field 242.

Among the tables shown in FIGS. 4 through 7, the synchronous MP flag in the MP setting information table shown in FIG. 4 may be updated by any one of the MPs 121, while the various values in the tables shown in FIGS. 5 through 7 are updated by the management console 20.

Figure 8:
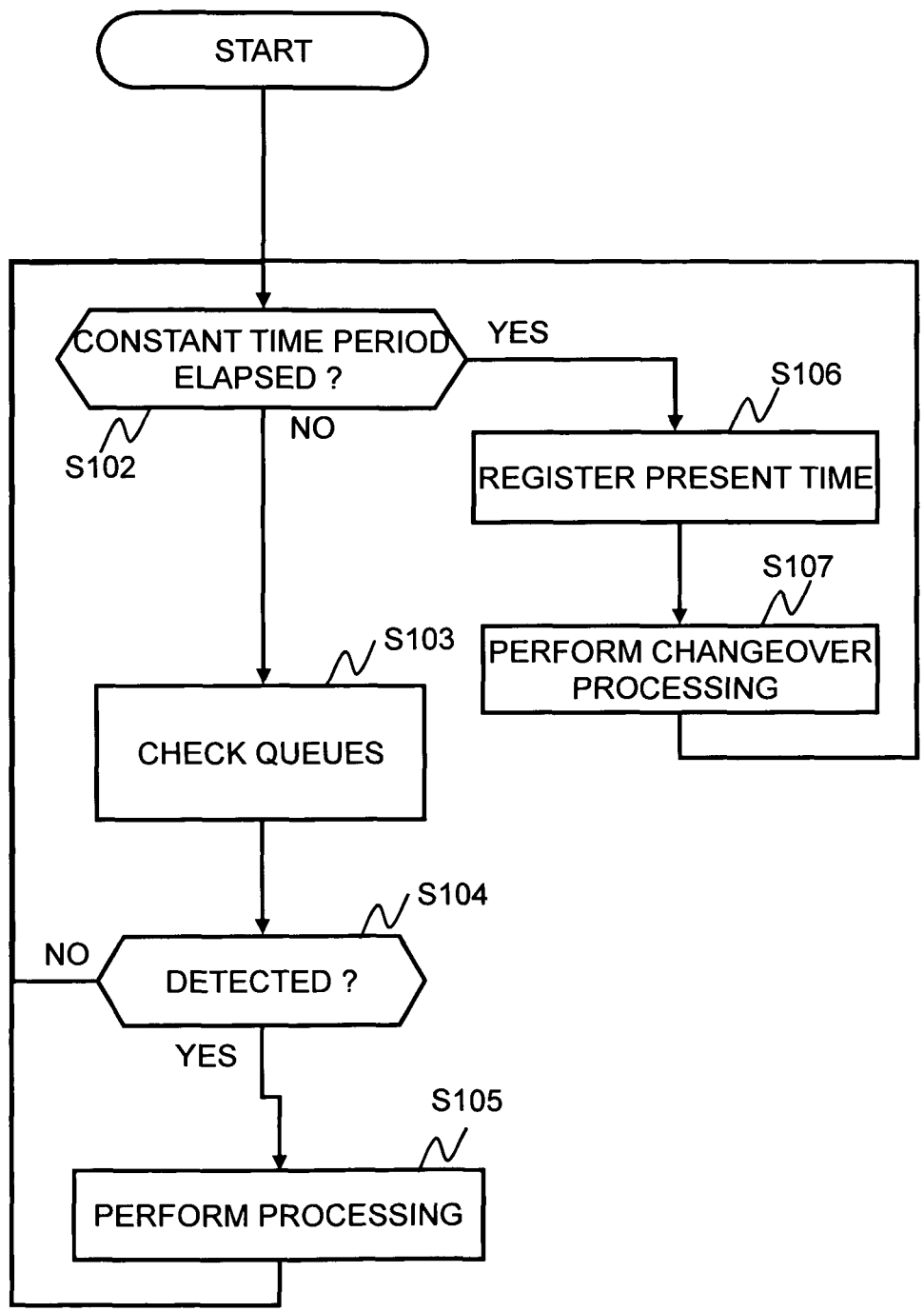
[FIG. 8]
Figure 9:
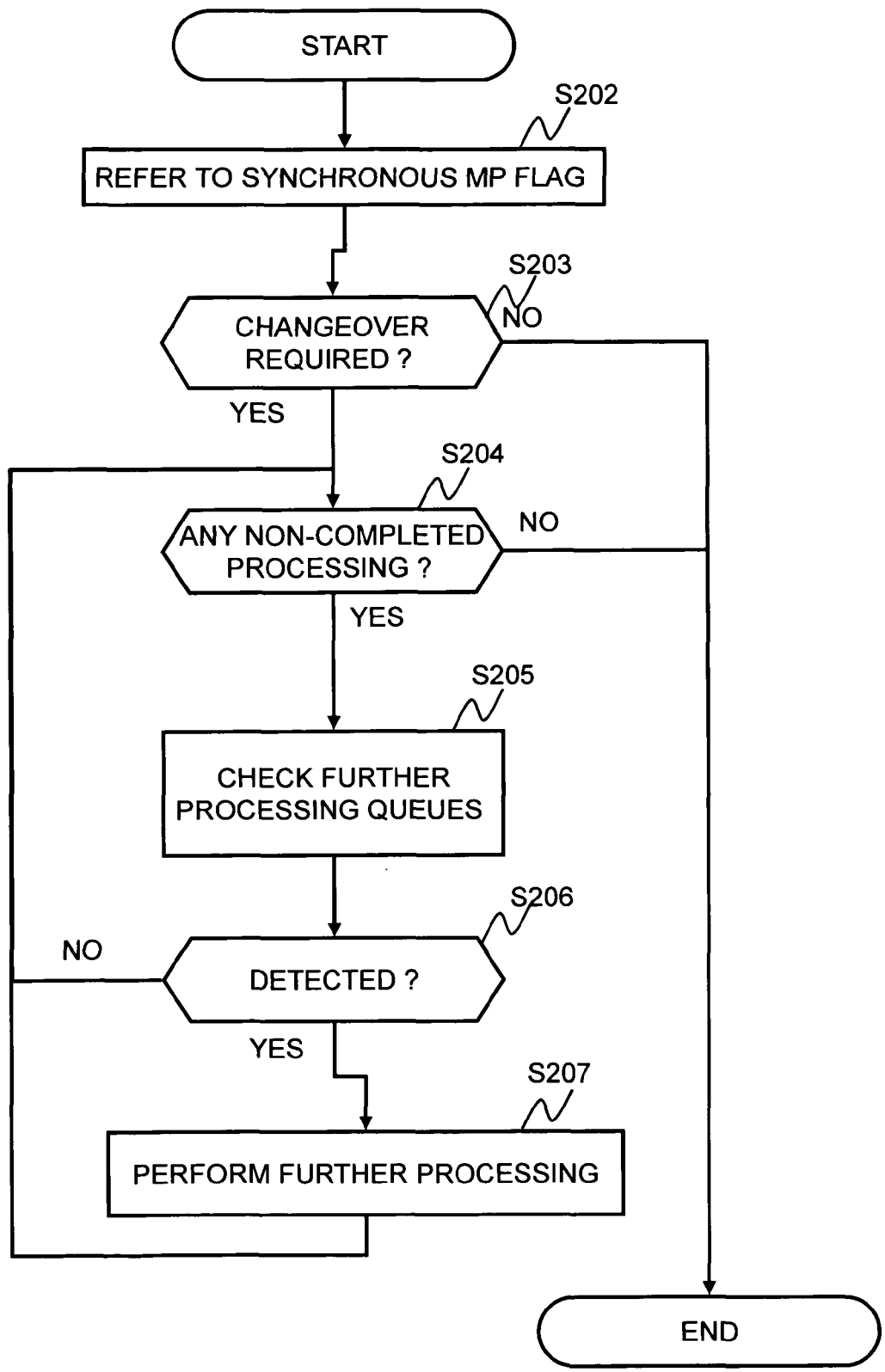
[FIG. 9]
Figure 10:
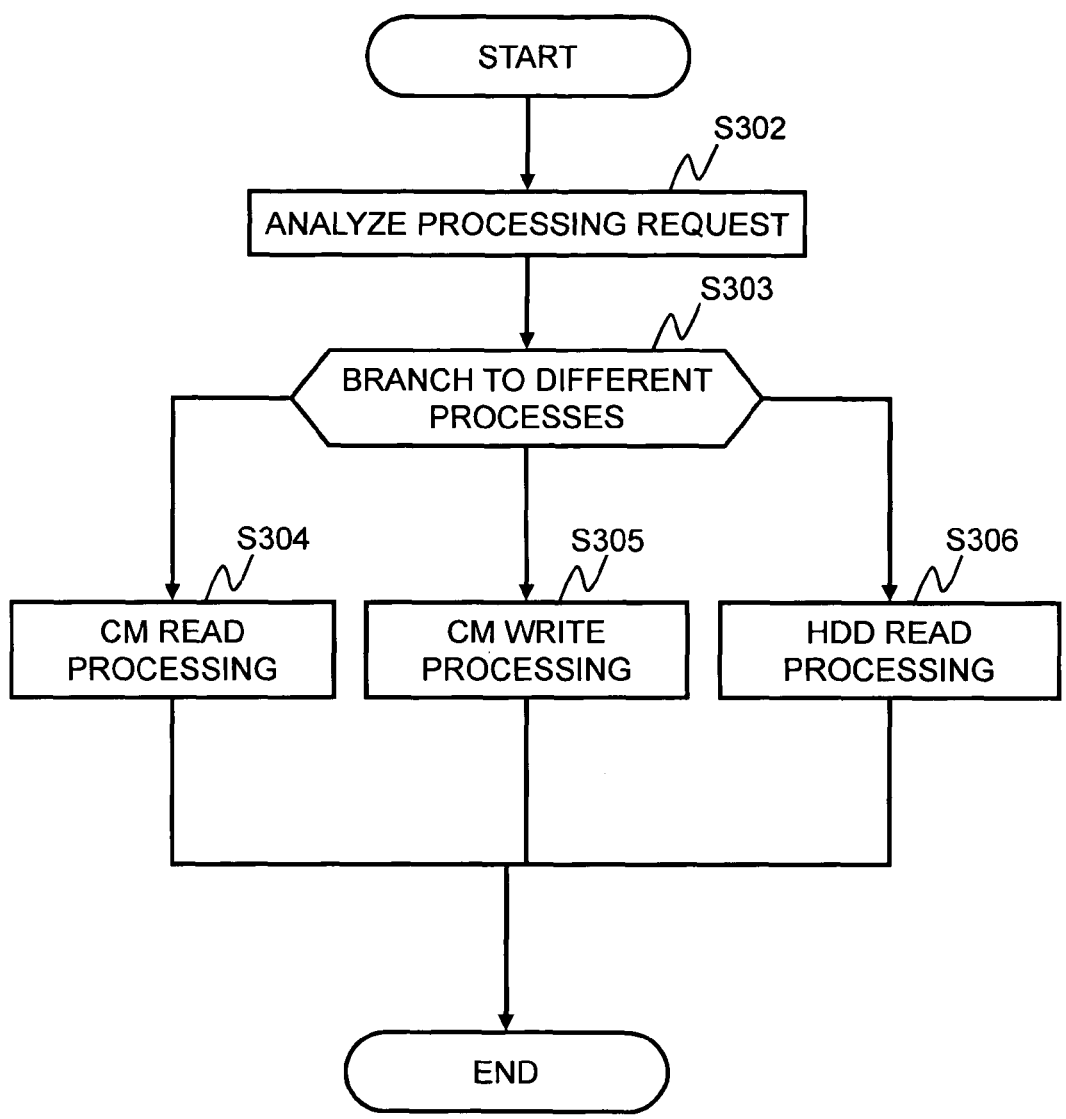
[FIG. 10]
Figure 11:
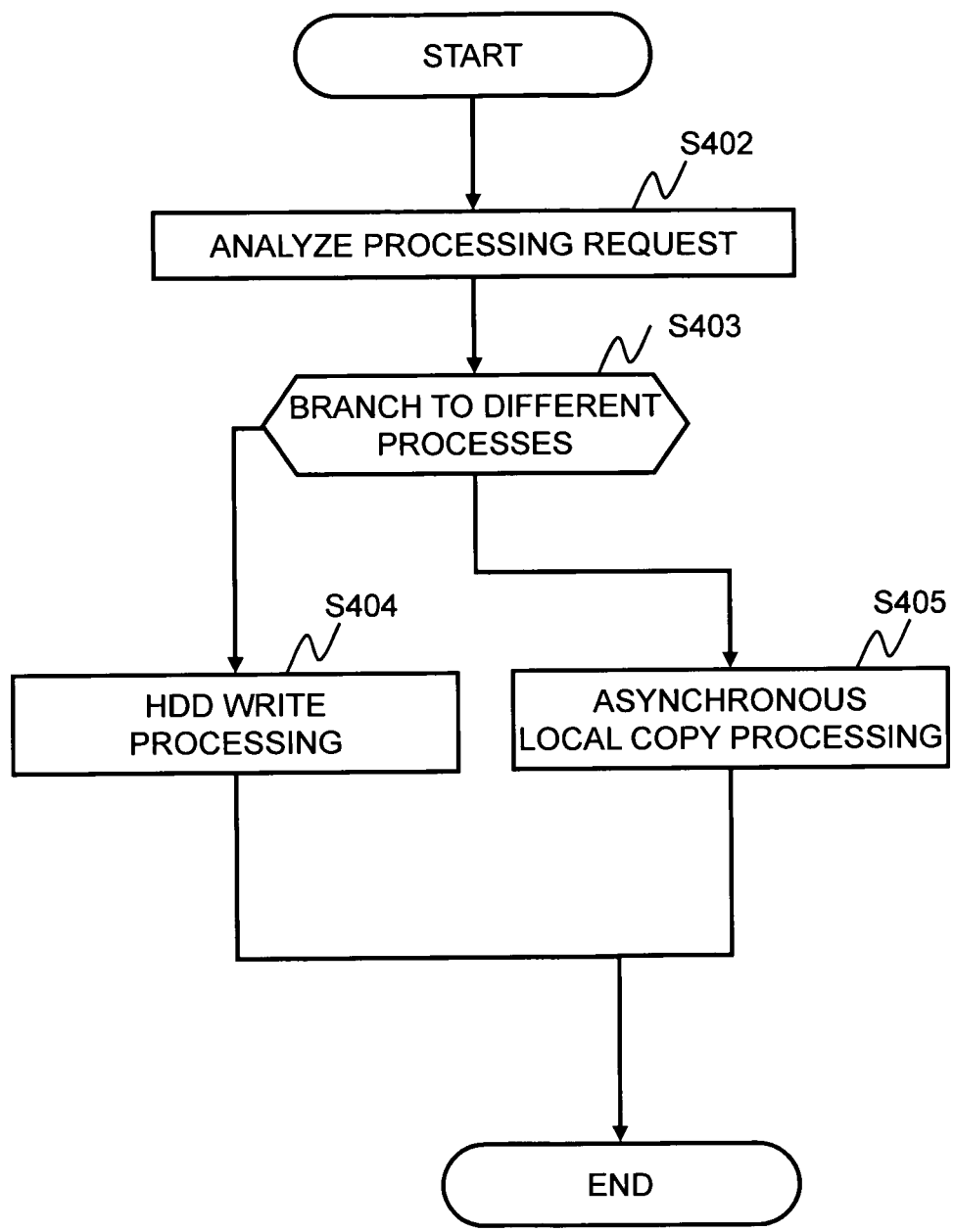
[FIG. 11]
Figure 12:
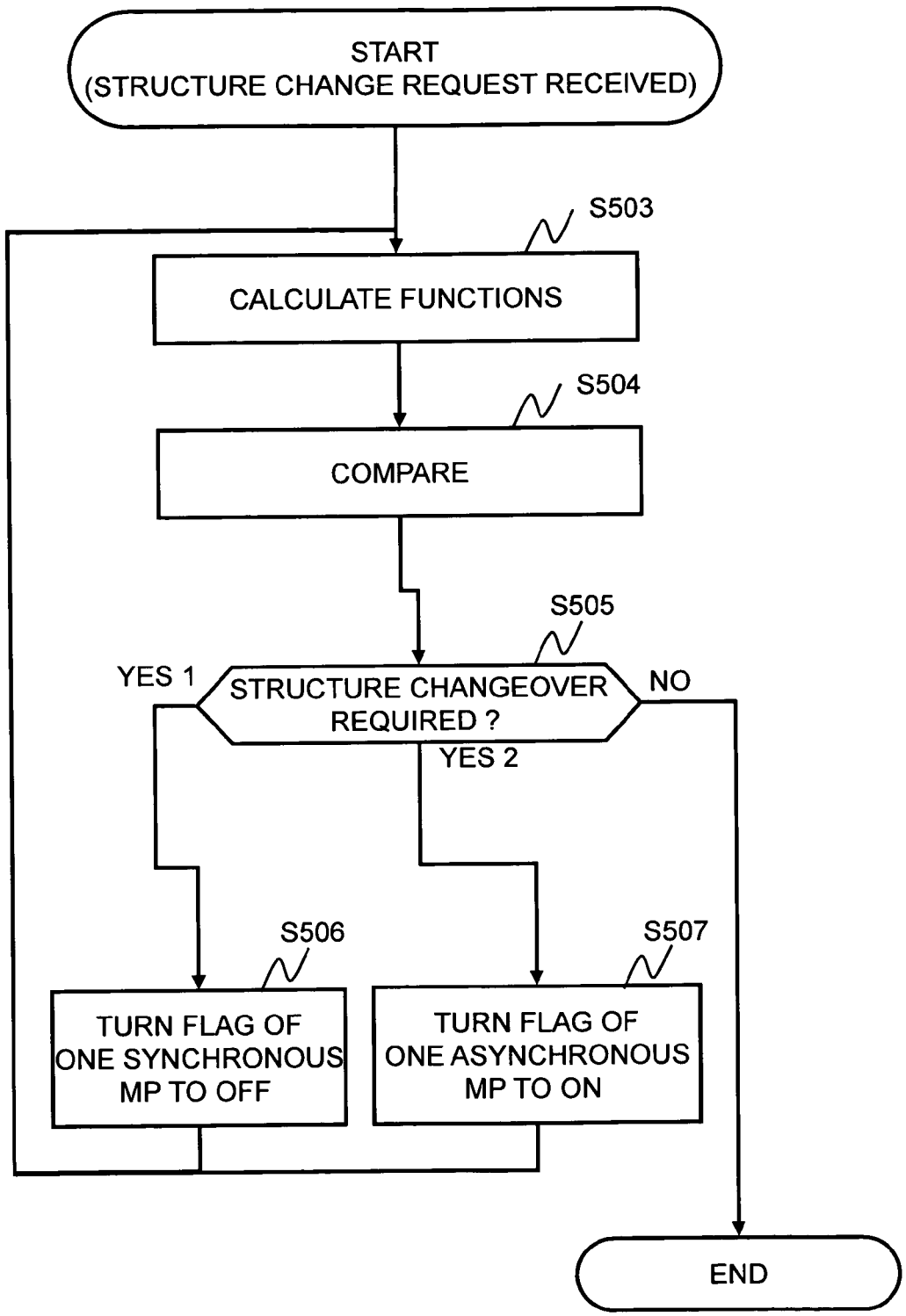
[FIG. 12]
Figure 13:
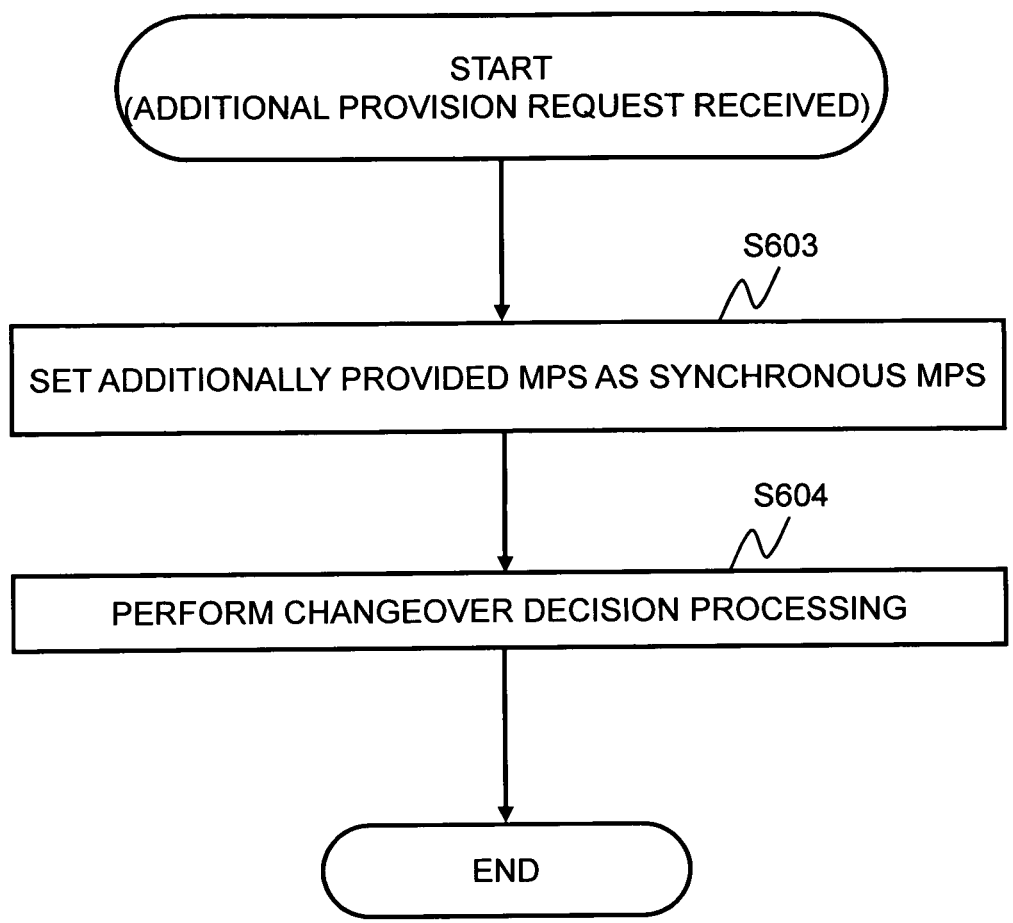
[FIG. 13]

FIGS. 8 through 13 are flow charts for processing executed by the MPs 121. In concrete terms, FIG. 8 is a flow chart for the I/O processing, FIG. 9 is a flow chart for so-called changeover processing after the I/O processing, FIG. 10 is a flow chart for so-called synchronous processing after the I/O processing and the changeover processing, and FIG. 11 is a flow chart for so-called asynchronous processing after the I/O processing and the changeover processing; and these processes are executed by the MPs 121. Moreover, FIG. 12 is a flow chart for processing for deciding whether or not the number of synchronous MPs and the number of asynchronous MPs has changed (i.e. changeover decision processing), and FIG. 13 is a flow chart for processing when additionally providing an MPPK; and these processes are executed by the MP 121 which has received the structural change.

FIG. 8 is a flow chart for the I/O processing. It should be understood that, in the explanation of FIG. 8, one of the MPs is taken as an example, and this MP is referred to as the "subject MP".

The subject MP 121 compares together the time instant of changeover processing the previous time (i.e. the time instant that the changeover processing started the immediately previous time), which for example is recorded in the. LM 122, and the present time instant, and decides whether or not a constant time period has elapsed after the execution of changeover processing (in a step S107) the previous time (i.e., whether or not the difference between the time instant of changeover processing the previous time and the present time instant is greater than that constant time period) (in a step S102).

If the result is that the constant time period has not elapsed (NO in the step S102), then, if the subject MP 121 is a synchronous MP, the subject MP 121 checks the initial synchronous processing queue 310 or the further synchronous processing queue 320, while on the other hand, if the subject MP 121 is an asynchronous MP, the subject MP 121 checks the initial asynchronous processing queue 330 or the further asynchronous processing queue 340 (a step S103). And the synchronous MP 121 decides whether or not the synchronous processing request or the asynchronous processing request is in any one of these queues (a step S104).

If the result is that the synchronous processing request or the asynchronous processing request has been detected (YES in the step S104), then the subject MP 121 executes synchronous processing or asynchronous processing (in a step S105), and then the flow of control returns to the step S102.

On the other hand, if the synchronous processing request or the asynchronous processing request has not been detected (NO in the step S104), then the subject MP 121 does not perform any task, and the step S102 is executed once again.

And, if result of the decision in the step S102 is that the constant time period has elapsed (YES in the step S102), then the subject MP 121 registers the present time instant in, for example, the LM 122 (a step S106). Thereafter, the subject MP 121 performs the changeover processing shown in FIG. 9 (a step S107).

FIG. 9 is a flow chart for the changeover processing (of the step S107). It should be understood that, in the explanation of FIG. 9, one of the MPs is taken as an example, and this MP is referred to as the "subject MP".

The subject MP 121 specifies from the MP setting information table 210 the synchronous MP flag which corresponds to the MP number of the subject MP 121 (a step S202), and decides whether or not the value of that synchronous MP flag which it has specified is changed (a step S203).

If the result of the decision in the step S203 is that the value of the synchronous MP flag is not changed (NO in the step S203), then this changeover processing terminates.

On the other hand, if the result of the decision in the step S203 is that the value of the synchronous MP flag has changed (YES in the step S203), then the subject MP 121 makes a decision as to whether or not any synchronous processing or asynchronous processing which is not yen terminated although it has been started (i.e. non-completed processing) currently exists (a step S204). In concrete terms, for example, the MP 121 raises a flag (hereinafter termed the "completion check flag") when initial synchronous processing (and initial asynchronous processing) which is described subsequently has started, and drops this completion check flag when further synchronous processing, to be described hereinafter, which is performed after the initial synchronous processing has been completed. By doing this, the subject MP 121 is able to decide whether or not there is any non-completed processing, by whether or not there are completion check flags which are raised.

If the result of the decision in the step S204 is that there is no non-completed processing (NO in the step S204), then this changeover processing terminates.

On the other hand, if the result of the decision in the step S204 is that there is some non-completed processing (YES in the step S204), then, when the value of the synchronous MP flag is changed from a value which specifies a synchronous MP to a value which specifies an asynchronous MP, the subject MP 121 checks the further synchronous processing queue 320; while, when the value of the synchronous MP flag is changed from a value which specifies an asynchronous MP to a value which specifies a synchronous MP, the subject MP 121 checks the further asynchronous processing queue 340 (a step S205); and then the subject MP 121 decides whether or not there is a completion message in the queue 320 or in the queue 340 (a step S206).

If the result of the decision in the step S206 is that a completion message has been detected (YES in the step S206), then the subject MP 121 performs synchronous processing (for example further synchronous processing) or asynchronous processing (for example further asynchronous processing) (a step S207), and then the flow of control returns to the step S204.

On the other hand, if the result of the decision in the step S206 is that no completion message has been detected (NO in the step S206), then the subject MP 121 does not do anything, and then the flow of control returns to the step S204.

In other words, in the changeover processing, the subject MP 121 only completes any processing which has been started by the subject MP 121 but has not yet been completed, but does not start new synchronous processing or asynchronous processing.

FIG. 10 is a flow chart for the synchronous processing. It should be understood that, in the explanation of FIG. 10, one of the synchronous MPs is taken as an example, and this MP is referred to as the "subject synchronous MP".

The subject synchronous MP 121 analyzes the processing request (a step S302), and decides what type of synchronous processing to perform (a step S303).

As a result, the subject synchronous MP 121 performs one of:

executing CM read processing in which the data which is to be the subject of reading is read from the CM 131 and sent to the host (a step S304); or executing CM write processing in which the data which is to be the subject of writing is written from the host into the CM 131 (a step S305); or executing HDD read processing in which the data which is to be the subject of reading is read from the HDD 170 and written into the CM 131 (a step S306).

In this embodiment, all of the steps S304 through S306 are synchronous processing, and the entire flow of FIG. 10 is also synchronous processing.

FIG. 11 is a flow chart for the asynchronous processing. It should be understood that, in the explanation of FIG. 11, one of the asynchronous MPs is taken as an example, and this MP is referred to as the "subject asynchronous MP".

The subject asynchronous MP 121 analyzes the processing request (a step S402), and decides what type of asynchronous processing to perform (a step S403).

As a result, the subject asynchronous MP 121 performs one of:

executing HDD write processing in which the data which is to be the subject of writing is read from the CM 131 and written to a HDD 170 (a step S404); or executing asynchronous local copy processing for a volume pair which correspond for asynchronous local copying (a step S405).

In this embodiment, both of the steps S404 and S405 are asynchronous processing, and the entire flow of FIG. 11 is also asynchronous processing.

FIG. 12 is a flow chart for the changeover decision processing. This processing is performed by an MP 121 which has received a structure change request from the management console 20 (hereinafter, in the explanation of FIG. 12, this will be termed the "subject MP"). A structure change request may be, for example, a request to change the contents of any one of the tables shown in FIGS. 5 through 7 (for example, to increase the value of the number I of mounted ports, or to decrease the value b which corresponds to RAID level 5, or the like).

The subject MP 121 calculates a number of synchronous MPs determination function $N_{smp}$ and a number of asynchronous MPs determination function $N_{asmp}$ (a step S503). $N_{smp}$ is obtained according to Equation (1), and $N_{asmp}$ is obtained according to Equation (2).

[Math. 1]

$$N_{smp} = \text{floor}\left(\frac{nl/L}{l/L + (m + a + 2b + 3c + p - q)/M}\right) \quad (1)$$

[Math. 2]

$$N_{asmp} = \text{ceil}\left(\frac{n(m + a + 2b + 3c + p - q)/M}{l/L + (m + a + 2b + 3c + p - q)/M}\right) \quad (2)$$

Here, the values of the various variables which are inserted into Equation (1) and Equation (2) are as described below.

I: the number of host I/Fs (ports) which are currently mounted; in concrete terms, the value described in the number mounted field 222 of the entry for which the structure name field 221 is "port", as shown in FIG. 5.

L: the maximum number of host I/Fs (ports) which can be mounted; in concrete terms, the value described in the maximum number mountable field 223 of the entry for which the structure name field 221 is "port", as shown in FIG. 5.

m: the number of HDDs 170 which are currently mounted; in concrete terms, the value described in the number mounted field 222 of the entry for which the structure name field 221 is "HDD", as shown in FIG. 5.

M: the maximum number of HDDs 170 which can be mounted; in concrete terms, the value described in the maximum number mountable field 223 of the entry for which the structure name field 221 is "HDD", as shown in FIG. 5.

n: the number of MPs 121 which are currently mounted: in concrete terms, the value described in the number mounted field 222 of the entry for which the structure name field 221 is "MP", as shown in FIG. 5.

a: the number of RAID groups (or HDDs 170) which correspond to RAID level 1; in concrete terms, the value described in the set number field 232 of the entry for which the RAID level field 231 is "1", as shown in FIG. 6.

b: the number of RAID groups (or HDDs 170) which correspond to RAID level 5; in concrete terms, the value described in the set number field 232 of the entry for which the RAID level field 231 is "5", as shown in FIG. 6.

c: the number of RAID groups (or HDDs 170) which correspond to RAID level 6; in concrete terms, the value described in the set number field 232 of the entry for which the RAID level field 231 is "6", as shown in FIG. 6.

p: the number of HDDs 170 (or volume pairs and/or logical volumes) which correspond to asynchronous local copying; in concrete terms, the value described in the set number field 242 of the entry for which the application name field 241 is "asynchronous local copy", as shown in FIG. 7.

q: the number of HDDs 170 (or volume pairs and/or logical volumes) which correspond to a cache resident function; in concrete terms, the value described in the set number field 242 of the entry for which the application name field 241 is "cache resident function", as shown in FIG. 7.

floor(x): a function which yields the maximum integer less than or equal to x.

ceil(x): a function which yields the minimum integer greater than or equal to x.

Here, if the value of one of $N_{smp}$ and $N_{asmp}$ has become zero, then 1 may be added to that one, with 1 being subtracted from the other one.

Equations (1) and (2) described above constitute a basis for the idea that synchronous processing is considered to become more necessary, when the number of the host I/Fs increases, while on the other hand asynchronous processing becomes more necessary, when the number of the HDDs 170 increases.

In concrete terms, Equations (1) and (2) described above respectively constitute bases for Equations (3) and (4) described below.

[Math. 3]

$$N_{smp} = \text{floor}\left(\frac{nl/L}{l/L + k/M}\right) \quad (3)$$

[Math. 4]

$$N_{asmp} = \text{ceil}\left(\frac{nk/M}{l/L + k/M}\right) \quad (4)$$

Here, the formula for calculating k includes m, and k increases if the value of m increases. According to Equations (1) through (4), a, b, c, p, and q are included as elements in k. In this embodiment, m is an essential element, and the other elements may not be necessarily included in k. Provided that at least one of a, b, and c is included in k, p and q need not necessarily be included; and, provided that at least one of p and q is included in k, none of a, b, and c need be included.

Equations (1) through (4) described above constitute a basis for the idea that asynchronous processing is considered to become more necessary, when the number of times the HDDs 170 are accessed increases.

In concrete terms, the coefficients a, b, and c are 1, 2, and 3 (the coefficients are all examples), and this is because it is considered that, among RAID 1, RAID 5, and RAID 6: RAID 1 manages with the fewest number of times of access to the HDDs 170; from the point of view of generating one parity for one stripe, RAID 5 manages with the next least number of times of access; and with RAID 6, the number of times of access is the greatest, from the point of view of generating two parities for one stripe.

Furthermore, the fact that k increases if p increases (for example, if p is added to) is because, when asynchronous local copying is performed, the HDD 170 is accessed without any relationship to accesses according to I/O requests.

Moreover, the fact that k decreases if q increases (for example, if q is subtracted from) is because, even if an I/O request in which the LUN of the logical volume which corresponds to the cache resident function is received, access to the CM 131 is sufficient, and access is not made to the HDD 170 which constitutes a basis for this logical volume.

The subject MP 121 compares the $N_{smp}$ which has been calculated and the present number of synchronous MPs, and also compares the $N_{asmp}$ which has been calculated and the present number of asynchronous MPs (a step S504), and makes a decision as to whether or not it is necessary to change the number of synchronous MPs and the number of asynchronous MPs (a step S505). The present number of synchronous MPs is the total count of entries for which the value of the synchronous MP flag is "1", while the present number of asynchronous MPs is the total count of entries for which the value of the synchronous MP flag is "0".

If the result of the step S504 is that the present number of synchronous MPs is equal to $N_{smp}$, and moreover that the present number of asynchronous MPs is equal to $N_{asmp}$, (NO in the step S505), then this processing terminates.

If the result of the step S504 is that the present number of asynchronous MPs is smaller than $N_{asmp}$ (YES-1 in the step S505), then the subject MP 121 selects any one of the synchronous MPs, and changes the value of the synchronous MP flag which corresponds to that synchronous MP from "1" to "0" (a step S506).

And, if the result of the step S504 is that the present number of synchronous MPs is smaller than $N_{smp}$ (YES-2 in the step S505), then the subject MP 121 selects any one of the asynchronous MPs, and changes the value of the synchronous MP flag which corresponds to that asynchronous MP from "0" to "1" (a step S507).

In the step S506 and/or the step S507, it would be acceptable to select the synchronous MP or the asynchronous MP at random. Moreover, it would also be acceptable for the synchronous MP or the asynchronous MP which is selected to be the MP whose utilization rate, which is the processing execution time in some fixed time period, is the lowest (for example that MP, among the synchronous MP group or the asynchronous MP group, for which the utilization rate is the lowest); or it would also be acceptable for it to be that MP for which the present length of the further synchronous processing queue 320 or of the further asynchronous processing queue 340 is the shortest (in other words, for which the number of accumulated requests is the fewest).

FIG. 13 is a flow chart showing the processing when additionally providing MPPKs. This processing is performed by an MP 121 which has received an MPPK additional provision request from the management console 20 (hereinafter, in the explanation of FIG. 13, this will be referred to as the "subject MP").

The subject MP 121 adds to the MP setting information table 210 the same number of entries as the number of MPs which have been added, and sets the synchronous MP flags in these entries to "1", and moreover adds the number of MPs which have been added to the value of n described in the number mounted field 222 (a step S603).

Thereafter, the subject MP 121 performs the changeover decision processing (a step S604). The reason why the MPPK additional provision request is one type of the structure change request already described. In concrete terms, when the addition of the MPPKs is performed, a change takes place in the number of MPs, and consequently, as previously described, a change takes place in the value of n described in the number mounted field 222.

The above concludes the explanation of the first embodiment of the present invention.

According to the first embodiment of the present invention, both synchronous MPs and asynchronous MPs are present, and synchronous processing is always performed by a synchronous MP, while asynchronous processing is always performed by an asynchronous MP. Due to this, an advantageous effect may be anticipated, as explained below with reference to FIG. 15 as one example. In order to make this advantageous effect easy to understand, first, a problem which may occur if arrangements such as those of the first embodiment are not instituted will be explained with reference to FIG. 14, and then an example of the advantageous effects which may be anticipated with the first embodiment will be explained with reference to FIG. 15. At this time, it will be supposed that, in relation to one I/O request, the initial synchronous processing is performed over 1 [ms] (millisecond), that the hardware processing takes 1 [ms] (in other words, that waiting for the hardware is performed for 1 [ms]), and that after waiting for completion of the hardware processing, further synchronous processing is performed over 1 [ms]. On the other hand, it will be supposed that the asynchronous processing is performed over 5 [ms]. Moreover, it will be supposed that two host computers 180 are present: host #0 and host #1. Both the initial synchronous processing and the further synchronous processing are examples of synchronous processing. Furthermore, in FIGS. 14 and 15, t is the time axis.

<The Problem Which May Occur if Arrangements Such as Those of the First Embodiment are Not Instituted>

Figure 14:
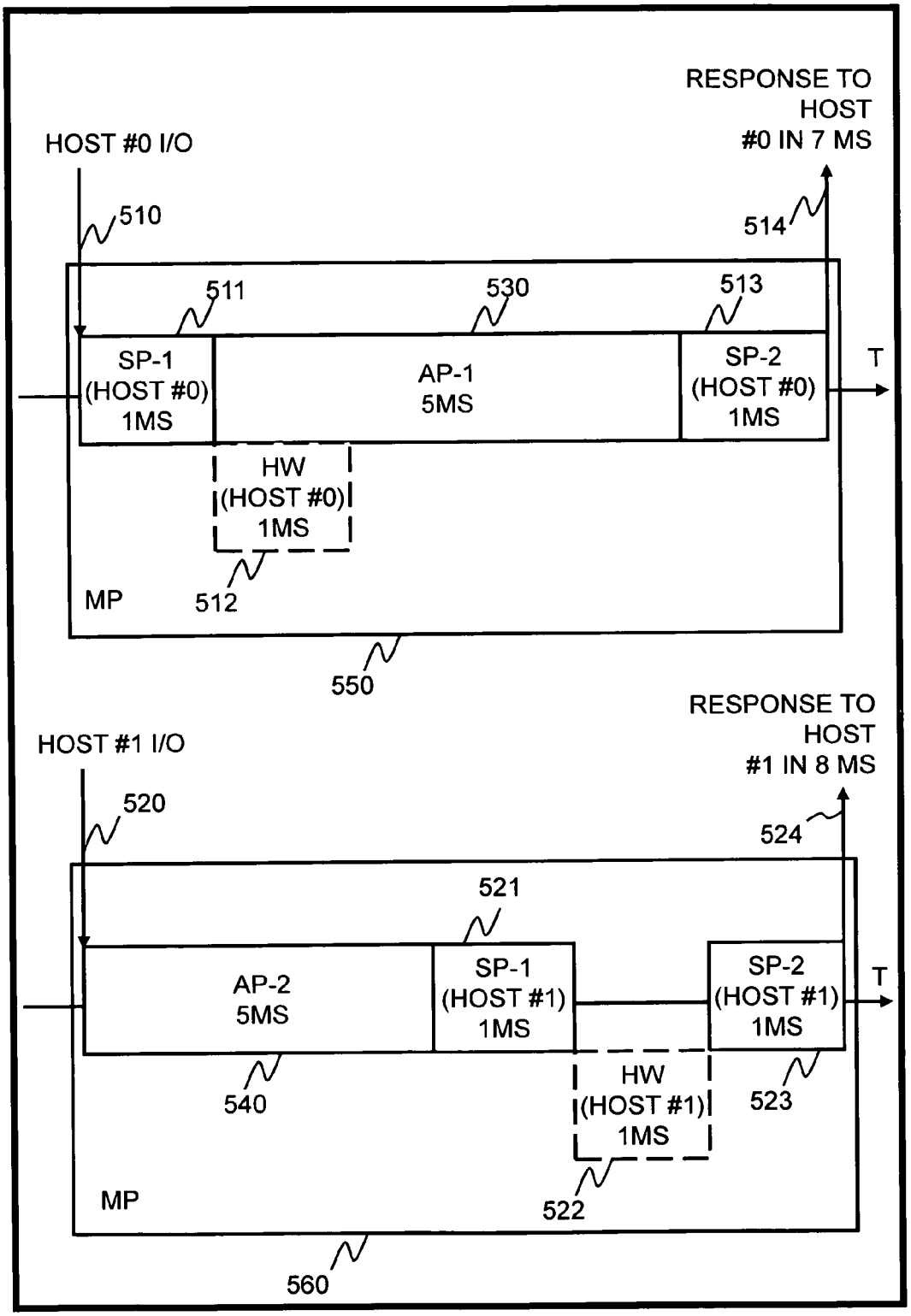
[FIG. 14]

As shown in FIG. 14, it is supposed that, for example, an I/O request 510 from host #0 is received and is stored in the initial synchronous processing queue 310. And it is supposed that, in this case, this I/O request 510 is processed by some MP 550. In concrete terms, for example, it may be supposed that the MP 550 performs the initial synchronous processing (SP-1) 511 over 1 [ms] (millisecond), and thereafter the hardware processing related to this I/O request takes 1 [ms] (waiting for the hardware (HW) 512), and, during this wait for the hardware, the MP 550 performs asynchronous processing 530 for 5 [ms]. In this case, the MP 550 performs further synchronous processing (SP-2) 513 over 1 ms after having waited for 4 [ms], and then returns a response 514 to the host #0. The result of this is that it takes 7 ms from when the I/O request 510 is received from the host #0, to when the response 514 is returned. In concrete terms, it is necessary to delay the start of the further synchronous processing 513 for 4 [ms] although it is not performed immediately the completion message is detected after the wait for the hardware 512.

On the other hand, it is supposed that the I/O request 520 from the host #1 is processed by the MP 560 which is a different MP from the MP 550. And it is supposed that the MP 560 has performed the asynchronous processing 540 in 5 [ms]. In this case, the MP 560 executes the initial synchronous processing (SP-1) 521 in 1 ms after having waited for 5 [ms]. Thereafter, with regard to the I/O request 520 of the host #1, after 1 [ms] has been taken by the hardware processing (waiting for the hardware (HW) 522), the MP 560 executes the further synchronous processing (SP-2) 523 in 1 [ms], and returns a response 524 to the host #1. As a result of these processes, it takes 8 [ms] from when the I/O request 520 is received from the host #1, until the response 514 is returned. In concrete terms, it is necessary to wait for 5 [ms] for the start of the initial synchronous processing which corresponds to this I/O request 520.

<An Example of the Advantageous Effects Which may be Anticipated with the First Embodiment of the Present Invention>

Figure 15:
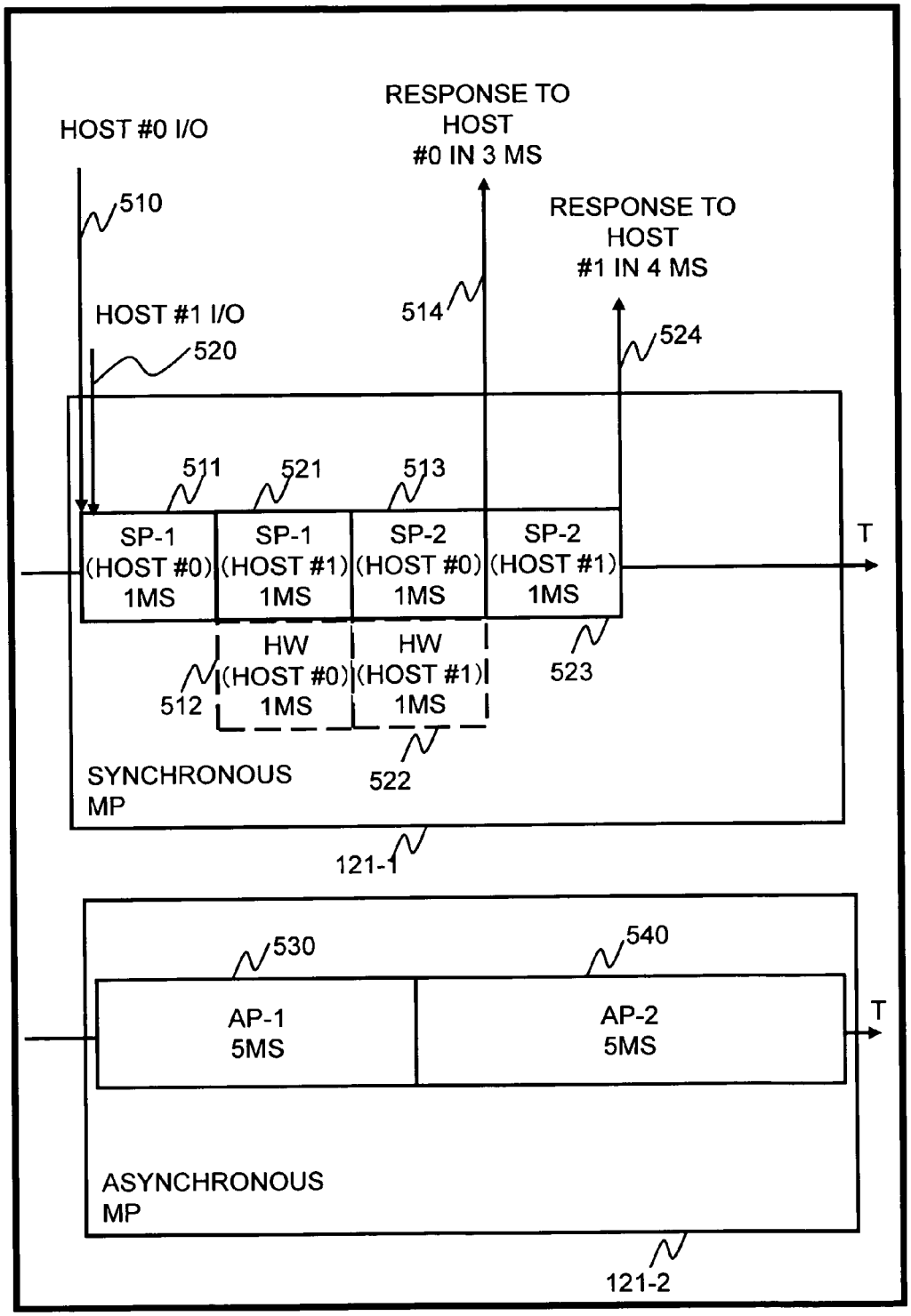
[FIG. 15]

As shown in FIG. 15, the MP 121-1 is a synchronous MP, while the MP 121-2 is an asynchronous MP.

The I/O request 510 from the host #0 and the I/O request 520 from the host #1 come to be processed by the synchronous MP 121-1. For example, if the I/O request 510 is received earlier than the I/O request 520, then the synchronous MP 121-1 first executes the initial synchronous processing (SP-1) 511 which corresponds to that I/O request 510 in 1 ms. Thereafter, in relation to that I/O request 510, it takes 1 [ms] for the hardware processing (waiting for the hardware (HW) 512).

During this time, the synchronous MP 121-1 executes the initial synchronous processing (SP-1) 521 which corresponds to the I/O request 520 from the host #1 in 1 [ms]. Thereafter, in relation to that I/O request 520, it takes 1 [ms] for the hardware processing (waiting for the hardware (HW) 522).

During this time, the synchronous MP 121-1 executes the further synchronous processing (SP-2) 513 which corresponds to the I/O request 510 from the host #0, and returns the response 514 to the host #0.

Thereafter, the synchronous MP 121-1 executes the further synchronous processing (SP-2) 523 which corresponds to the I/O request 520 from the host #1, and returns the response 524 to the host #0.

As a result of these processes, for the I/O request 510 from the host #0, the time period from receipt of the I/O request until returning a response (i.e. the response time) is 3 ms, while, for the I/O request 520 from the host #1, the response time is 4 ms. Each of these response times is shorter than the corresponding response time which has been explained with reference to FIG. 14.

On the other hand, the asynchronous MP 121-2 executes the asynchronous processing (AP-1) 530, and then executes the asynchronous processing (AP-2) 540. In other words, the asynchronous processing episodes 530 and 540 are also executed in parallel with the synchronous processing episodes 511, 521, 513, and 523. In conclusion, the throughput for the asynchronous processing is ensured.

According to the first embodiment as described above, it is possible to prevent delay of I/O response due to synchronous processing waiting for asynchronous processing, while still ensuring the throughput of the asynchronous processing.

[Mode for the Invention 2]

In the following, a second embodiment of the present invention will be explained. During this description, the explanation will concentrate upon the points of difference from the first embodiment, and explanation of features which are common with the first embodiment will be omitted or simplified (this is the same with the third embodiment which will be described hereinafter).

Figures 16, 17:
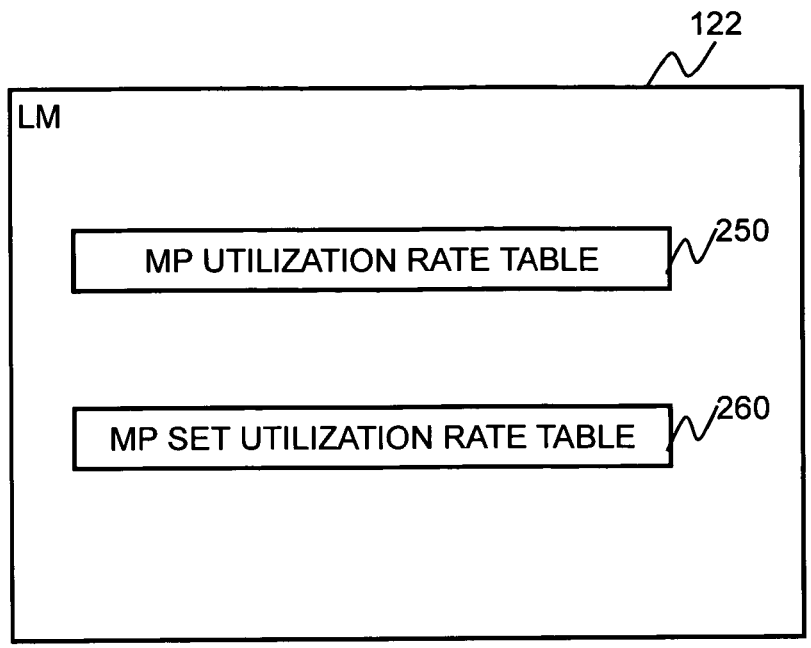
[FIG. 16]
[FIG. 17]

In this second embodiment, as shown in FIG. 16, in the LM 122, in addition to the tables 210 through 240 which have been explained in connection with the first embodiment, there are also stored an MP utilization rate table 250 and a MP set utilization rate table 260. The MP set utilization rate table 260 is a table which contains a utilization rate threshold value. This utilization rate threshold value may be a value which is set upon shipment of the system from the factory, or it may be a value which is set by the user using the management console 20. The utilization rate threshold value may be a fixed value, or may be a variable value. If the utilization rate threshold value is a variable value, then this utilization rate threshold value may be changed, for example, in a timely manner according to the operational state of the storage system by a representative MP which will be described hereinafter (or by some MP other than the representative MP), or may also be changed by the user at any time point which he may desire, by using the management console 20. The MP set utilization rate table 260 may contain a plurality of utilization rate threshold values. For example, one of the utilization rate threshold values may be a value for asynchronous processing and another of them may be a value for synchronous processing.

FIG. 17 shows the structure of the MP utilization rate table 250.

This MP utilization rate table 250 specifies the current utilization rates of the various MPs 121. In concrete terms, for example, for each MP 121, the MP utilization rate table 250 has an entry which includes an MP number field 251 and a utilization rate field 252.

An MP number, which is the identification number of the MP 121, is stored in the MP number field 251.

Information which specifies the current utilization rate of the MP (for example in units of %) is stored in the utilization rate field 252. This utilization rate described in the utilization rate field 252 is updated by each MP 121 to the current utilization rate of that MP 121, for example periodically or aperiodically.

Figure 18:
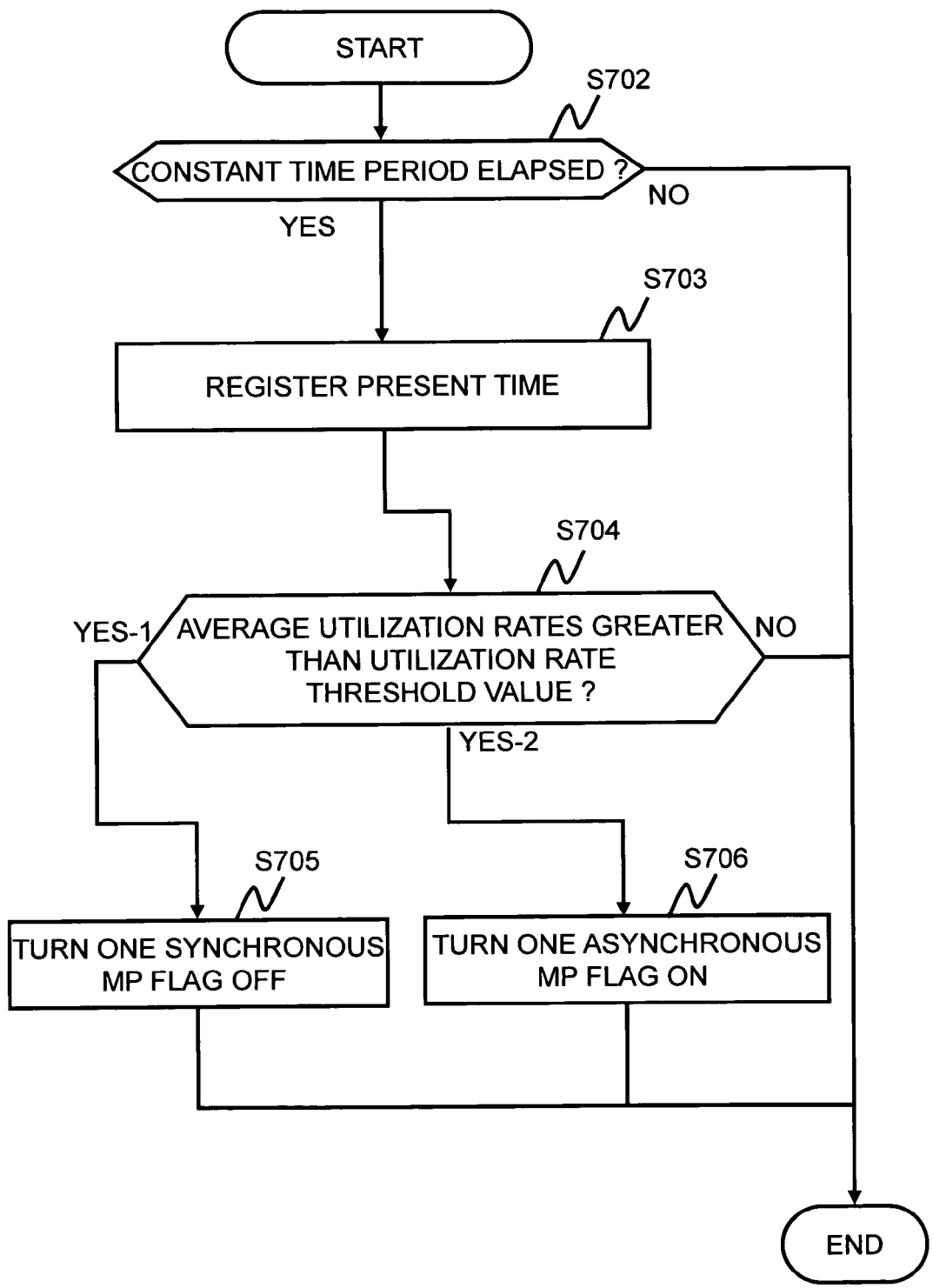
[FIG. 18]
Figure 19:
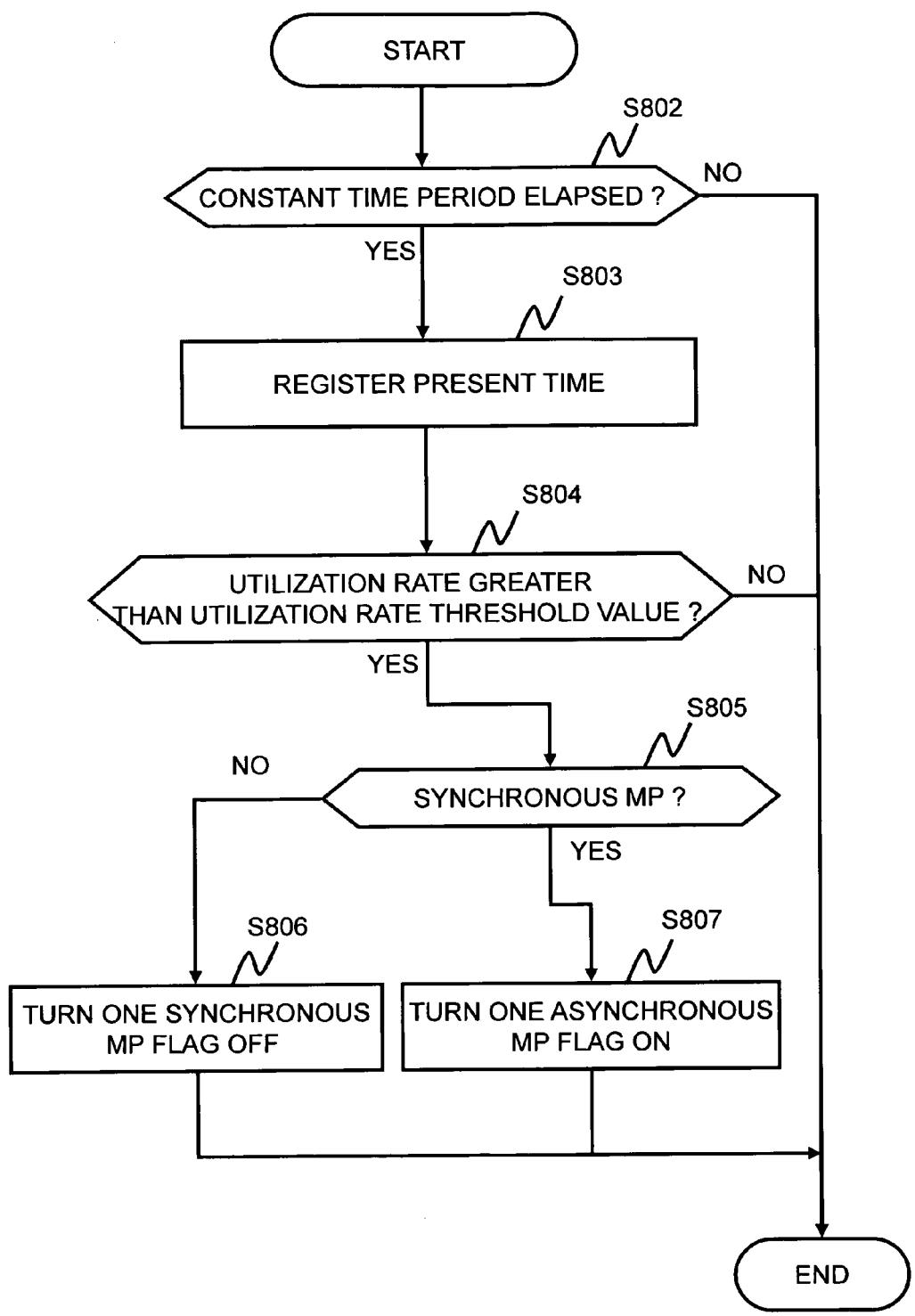
[FIG. 19]

In this second embodiment, in addition to (or instead of) the processing explained above with reference to FIGS. 8 through 13, representative changeover decision processing shown in FIG. 18 and individual changeover decision processing shown in FIG. 19 are performed. Computer programs for performing these processes are, for example, stored in the LM 122, and these computer programs are executed by an MP 121.

FIG. 18 is a flow chart for the representative changeover decision processing.

This processing is performed by the representative MP. The representative MP is one MP (or two or more MPs) among the plurality of MPs 121. This MP could be an MP which is designated from the management console 20, or could be an MP which is determined by the storage system in advance.

The representative MP 121 compares together the changeover processing time instant the previous time (i.e. the time instant that representative changeover decision processing was performed the immediately previous time) and the present time instant, and decides whether or not a constant time period has elapsed from the changeover processing time instant the previous time (a step S702).

If the result is that the constant time period has not elapsed (NO in the step S702), then this processing terminates.

On the other hand, if the constant time period has elapsed (YES in the step S702), then the representative MP 121 registers the present time instant in, for example, the LM 122 (a step S703).

After this, the representative MP 121 refers to the MP setting information table 210 and specifies the synchronous MPs and the asynchronous MPs, refers to the MP utilization rate table 250 and calculates the average value of the utilization rates of the synchronous MPs (hereinafter, this will be termed the average utilization rate of the synchronous MPs) and the average value of the utilization rates of the asynchronous MPs (hereinafter, this will be termed the average utilization rate of the asynchronous MPs), and compares each of the average utilization rate of the synchronous MPs and the average utilization rate of the asynchronous MPs which have thus been calculated with the utilization rate threshold value which are given in the MP set utilization rate table 260 (a step S704).

If the result is that both the average utilization rate for the synchronous MPs and the average utilization rate for the asynchronous MPs are greater than the respective utilization rate threshold value, or that both of these utilization rates are less than the respective utilization rate threshold value (NO in the step S704), then this processing terminates.

And, if the result of the step S704 is that only the average utilization rate of the asynchronous MPs exceeds its utilization rate threshold value (YES-1 in the step S704), then the representative MP 121 selects any desired one of the synchronous MPs, and changes the value of the synchronous MP flag which corresponds to this synchronous MP from "1" to "0" (a step S705). Since, due to this, the number of the asynchronous MPs increases, accordingly it may be anticipated that the average utilization rate of the asynchronous MPs drops.

On the other hand, if the result of the step S704 is that only the average utilization rate of the synchronous MPs exceeds its utilization rate threshold value (YES-2 in the step S704), then the representative MP 121 selects any desired one of the asynchronous MPs, and changes the value of the synchronous MP flag which corresponds to this asynchronous MP from "0" to "1" (a step S706). Since, due to this, the number of the synchronous MPs increases, accordingly it may be anticipated that the average utilization rate of the synchronous MPs drops.

FIG. 19 is a flow chart for the individual changeover decision processing.

This processing is performed by each MP. Due to this, this processing can also be performed by the representative MP. In the following, in the explanation of FIG. 19, some one MP will be taken as an example, and this MP will be termed the "subject MP".

The subject MP 121 compares together the changeover processing time instant the previous time (i.e. the time instant that individual changeover decision processing was performed the immediately previous time) and the present time instant, and decides whether or not a constant time period has elapsed from the changeover processing time instant the previous time (a step S802).

If the result is that the constant time period has not elapsed (NO in the step S802), then this processing terminates.

On the other hand, if the constant time period has elapsed (YES in the step S802), then the subject MP 121 registers the present time instant in, for example, the LM 122 (a step S803).

After this, the subject MP 121 compares the utilization rate which corresponds to the subject MP 121 (i.e. the value which is recorded in the utilization rate field 252) with the utilization rate threshold value (which is recorded in the table 260), and decides whether or not this current utilization rate is greater than the utilization rate threshold value (a step S804).

If the result is that the current utilization rate is less than the utilization rate threshold value (NO in the step S804), then this processing terminates.

On the other hand, if the current utilization rate is greater than the utilization rate threshold value (YES in the step S804), then the subject MP 121 makes a decision as to whether or not the value of the synchronous MP flag which corresponds to the subject MP 121 is "1" (a step S805).

And, if the result of the step S805 is that the value of the synchronous MP flag is "0" (NO in the step S805), then the subject MP 121 selects one of the synchronous MPs, and changes the value of the synchronous MP flag which corresponds to this synchronous MP from "1" to "0" (a step S806). Since, due to this, the number of the asynchronous MPs increases, accordingly it may be anticipated that the load upon the subject MP 121 will be mitigated (i.e. that the utilization rate of the subject MP 121 will drop).

On the other hand, if the result of the step S805 is that the value of the synchronous MP flag is "1" (YES in the step S805), then the subject MP 121 selects one of the asynchronous MPs, and changes the value of the synchronous MP flag which corresponds to this asynchronous MP from "0" to "1" (a step S807). Since, due to this, the number of the synchronous MPs increases, accordingly it may be anticipated that the load upon the subject MP 121 will be mitigated (i.e. that the utilization rate of the subject MP 121 will drop).

It would be acceptable, in the step S705 and/or the step S706 of FIG. 18, and/or the step S806 and/or the step S807 of FIG. 19, for the synchronous MP or the asynchronous MP to be selected at random. Moreover, it would also be acceptable for the synchronous MP or the asynchronous MP to be that MP whose utilization rate, which is the time period that it executes processing within some constant time period, is the lowest (for example, that MP within a group of synchronous MPs or a group of asynchronous MPs whose utilization ratio is the lowest); or it would also be acceptable for it to be that MP for which the current length of the further synchronous processing queue 320 or of the further asynchronous processing queue 340 is the shortest (in other words, that MP for which the number of accumulated requests is the least).

Each of FIGS. 20 through 23 shows an example of a screen (hereinafter termed a "management screen") which is displayed upon the display unit 28 of the management console 20.

Figure 20:
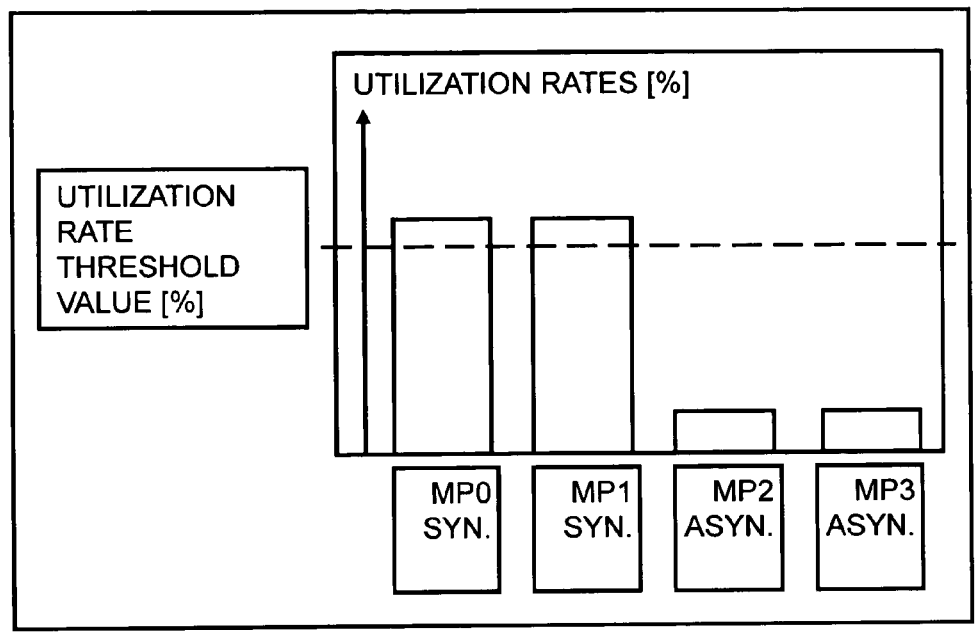
[FIG. 20]

As shown for example in FIG. 20, on this management screen, there is displayed a graph which shows, for each MP, the relationship between its current utilization rate and the utilization rate threshold value. According to FIG. 20, for example, it will be understood that the current utilization rates for the two synchronous MPs #0 and #1 are greater than the utilization rate threshold value.

Figure 21:
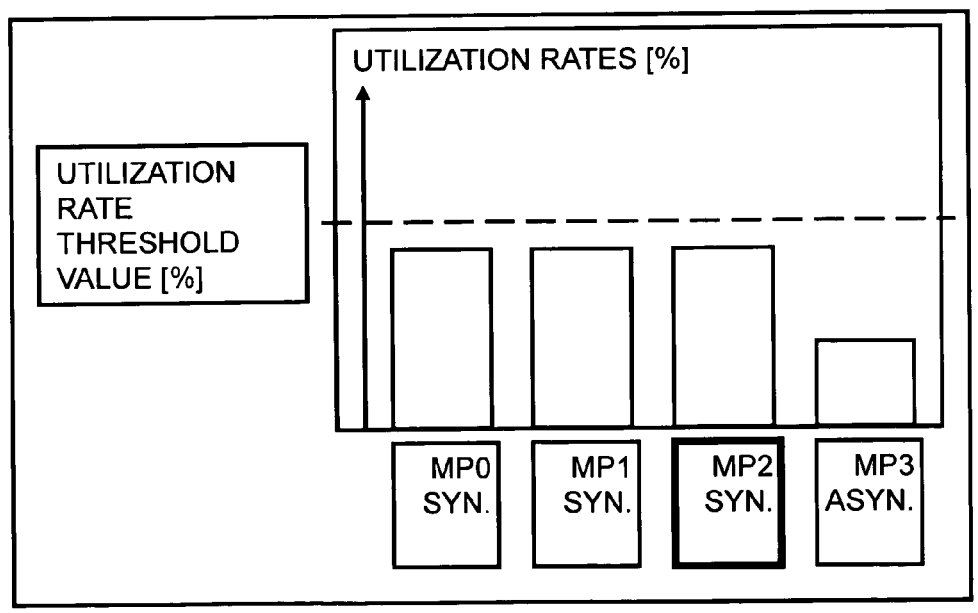
[FIG. 21]

If the current utilization rate of the two synchronous MPs #0 and #1 exceeds the utilization rate threshold value, then, as shown in FIG. 21, the MP #2, which has been an asynchronous MP, is changed over to being a synchronous MP, so that the situation may be anticipated that the utilization rates of the synchronous MPs #0 and #1 will become lower than the utilization rate threshold value. The relationship between the current utilization rates of the various MPs after the changeover and the utilization rate threshold value is displayed upon the management screen, as for example shown in FIG. 21.

Figure 22:
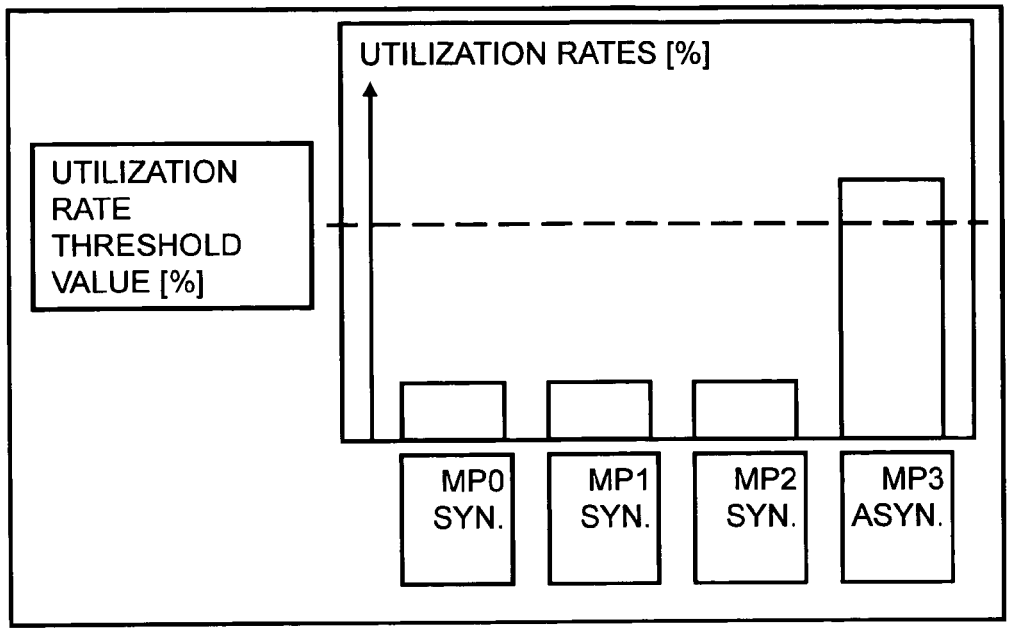
[FIG. 22]
Figure 23:
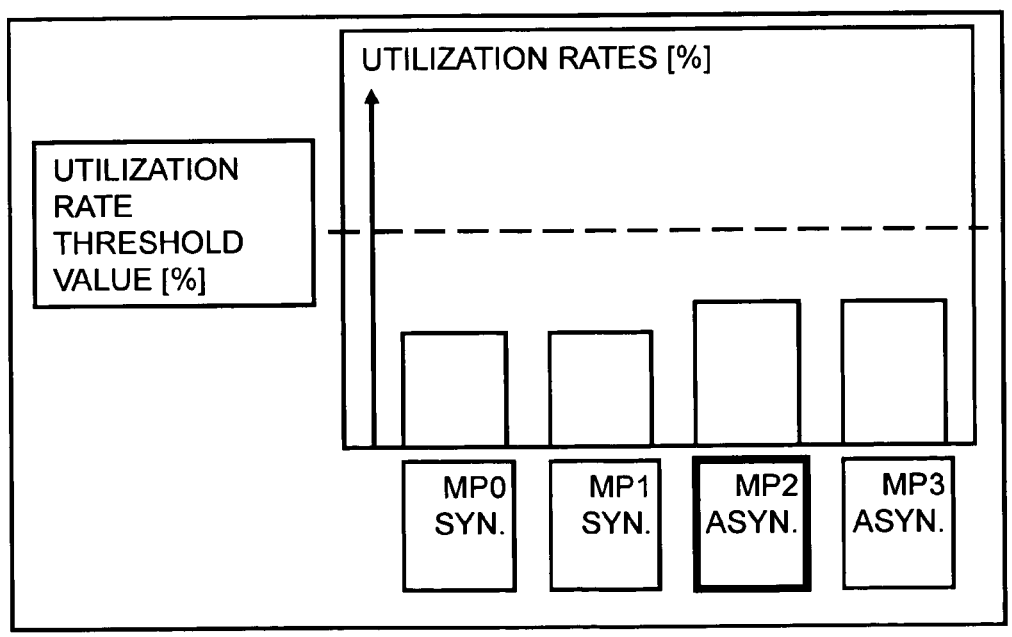
[FIG. 23]

If thereafter, as shown for example in FIG. 22, the utilization rate of the asynchronous MP #3 becomes higher than the utilization rate threshold value, then when, as shown in FIG. 23, the MP #2, which has been a synchronous MP, is changed over to being an asynchronous MP, the situation may be anticipated that the utilization rate of the asynchronous MP #3 will become lower than the utilization rate threshold value. The relationship between the current utilization rates of the various MPs after the changeover and the utilization rate threshold value is displayed upon the management screen, as for example shown in FIG. 23.

The above concludes the explanation of the second embodiment of the present invention.

According to this second embodiment of the present invention, it is possible to change the number of synchronous MPs and the number of asynchronous MPs according to the load upon the synchronous MPs and the load upon the asynchronous MPs, and it is possible to prevent a large load from becoming concentrated upon any specified MP, which would be undesirable.

[Mode for the Invention 3]

Figure 24:
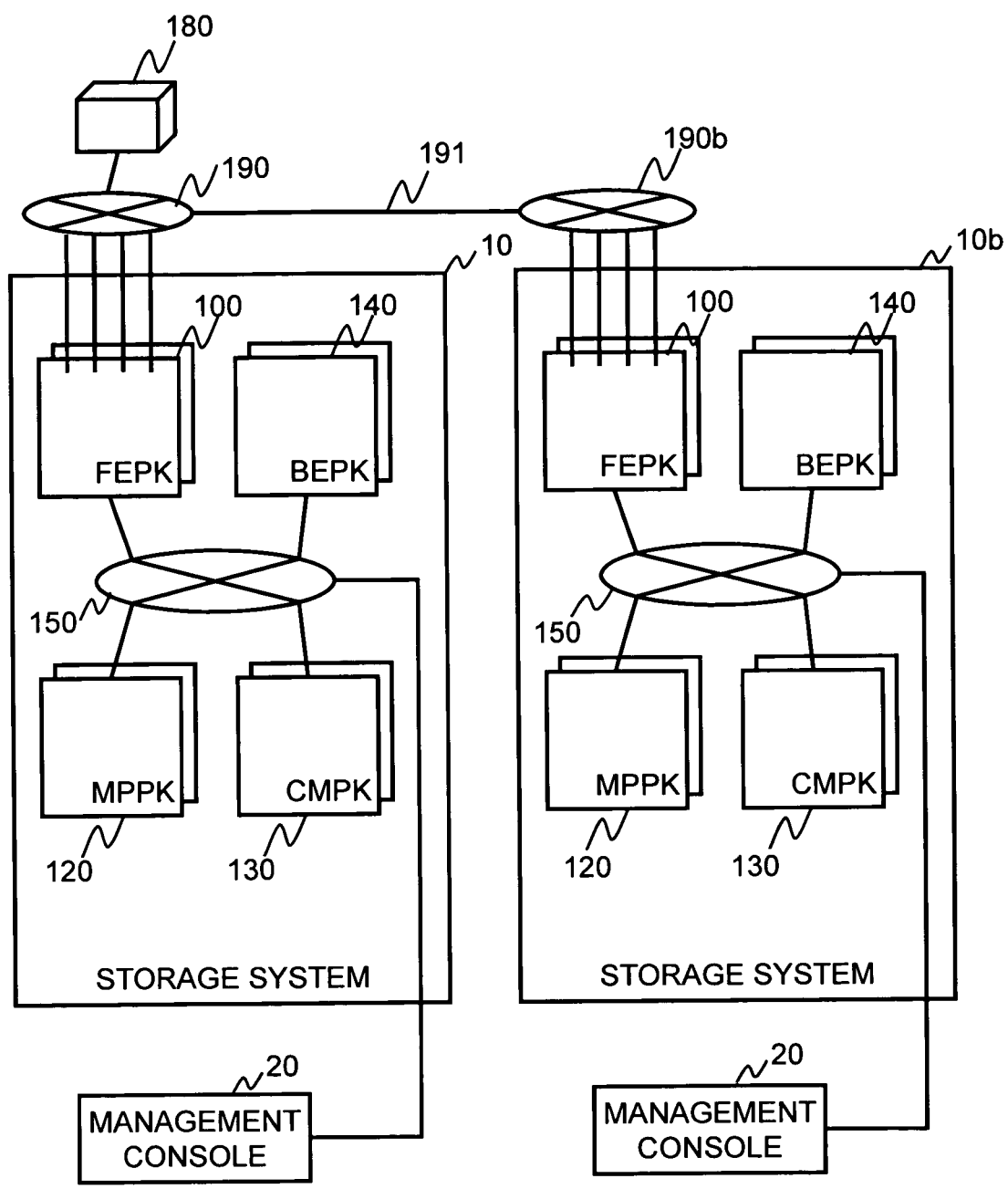
[FIG. 24]

FIG. 24 is an outline of a computer system according to the third embodiment of the present invention.

A communication network 190 (for example, a SAN or a LAN) is connected to another communication network 190b (also, for example, a SAN or a LAN) via a wide area circuit 191. This other communication network 190b is connected to a storage system 10b. A management console 20 is connected to the storage system 10b. In short, in this third embodiment, asynchronous remote copying is performed from a primary logical volume in the storage system 10 to a secondary logical volume in a different storage system 10. The structure for performing this asynchronous remote copying is not limited to the example shown in FIG. 24; it would also be acceptable to employ some other structure.

FIG. 25 shows the structure of the application setting number table 240, according to this third embodiment.

An entry is added into the application setting number table 240 for this asynchronous remote copy. This entry includes the application name "asynchronous remote copy" and the set number "r".

Figure 26:
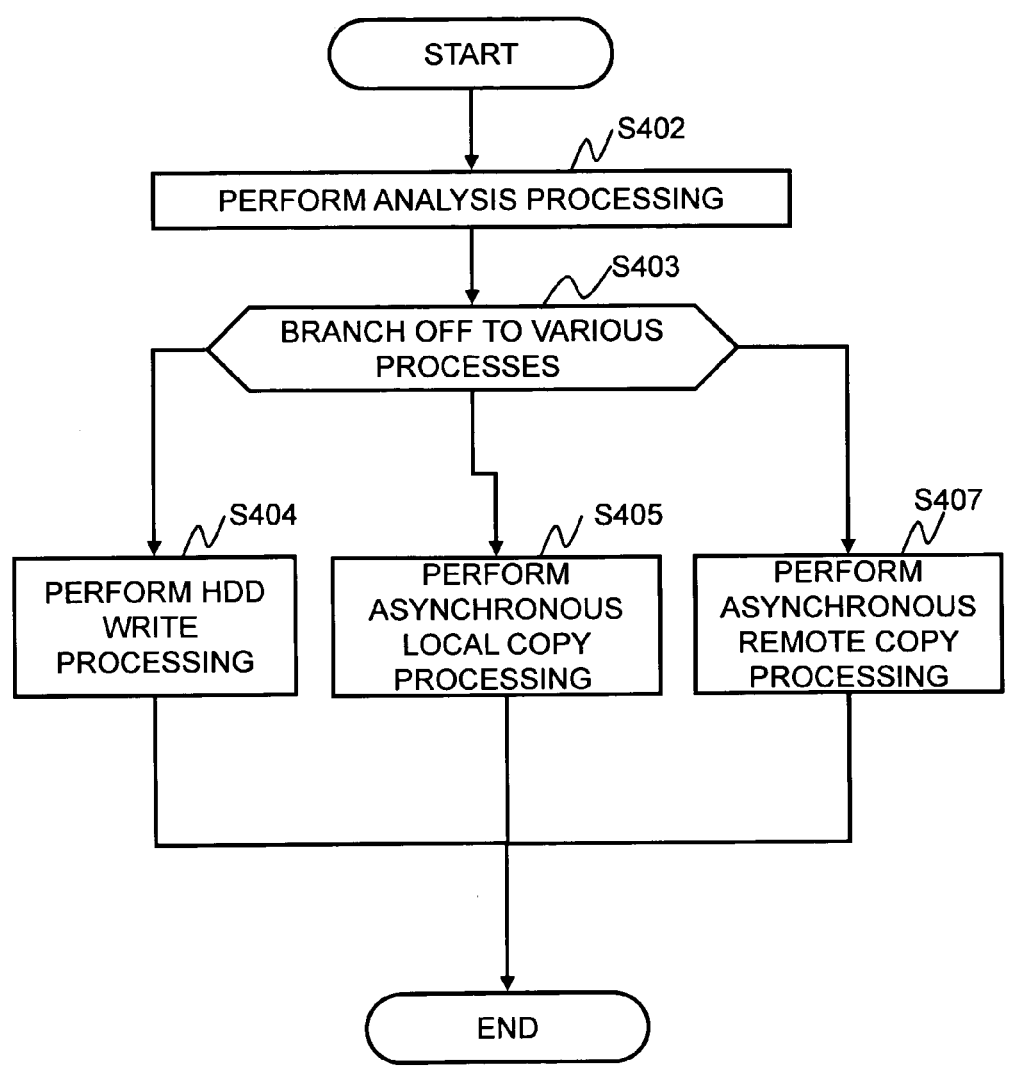
[FIG. 26]

FIG. 26 is a flow chart for the asynchronous processing according to the third embodiment.

In addition to the flow chart of the first embodiment for the execution of asynchronous processing, from the result of the step S403, a branch is added to an asynchronous remote copy processing step (a step S407).

In this third embodiment which is capable of executing asynchronous remote copying, in the step S503, a number of synchronous MPs determination function $N_{smp}$ and a number of asynchronous MPs determination function $N_{asmp}$ are provided according to Equations (5) and (6):

[Math. 5]

$$N_{smp} = \text{floor}\left(\frac{nl/L}{l/L + (m+a+2b+3c+p-q+r)/M}\right) \quad (5)$$

[Math. 6]

$$N_{asmp} = \text{ceil}\left(\frac{n(m+a+2b+3c+p-q+r)/M}{l/L + (m+a+2b+3c+p-q+r)/M}\right) \quad (6)$$

According to Equation (5) and Equation (6), a new variable r is included in the k in the previously described Equations (3) and (4). r is the number of the HDD 170 (or of the volume pair and/or the logical volume) which corresponds to this asynchronous remote copying; in concrete terms, it is the value which, as shown in FIG. 25, is contained in the set number field 242 of the entry whose application name field 241 is "asynchronous remote copy", The fact that k increases if r is to be increased (for example, it may be arranged for r to be counted up) is because, when an asynchronous remote copy is being performed, the HDD 170 is accessed without any relationship to its being accessed according to I/O requests.

According to the third embodiment as described above it is possible, when performing an asynchronous remote copy, to prevent delay in the I/O response due to the synchronous processing waiting for the asynchronous processing, while still ensuring the throughput of the asynchronous processing.

While preferred embodiments of the present invention have been explained above, the present invention is not to be considered as being limited to these embodiments; it goes without saying that, provided that the gist of the present invention is not departed from, various changes and alterations may be made possible thereto, without deviating from its appropriate scope.

For example, in the first through the third embodiments, "synchronous processing" is processing which must be executed in synchrony with an I/O request from the host computer 180 until a response is returned, and a concrete example thereof is the processing which has been explained with reference to FIG. 10. And "asynchronous processing" is specific processing of a type which is not synchronous processing (i.e. processing which need not be executed in synchrony with an I/O request from the host computer 180 until a response is returned), and concrete examples thereof are the processes which have been explained with reference to FIGS. 11 and 26. Processing apart from those two types may be supposed to be "processing of the third type" which belongs neither to synchronous processing nor to asynchronous processing. What processing belonging to the processing apart from synchronous processing is to be considered as being asynchronous processing, and which is to be considered as being such processing of the third type, may, for example, be decided in advance. An example of asynchronous processing is processing related to access to the HDD 170 (for example, processing which generates accesses to the HDD 170, such as all of HDD write processing, asynchronous local copying, and asynchronous remote copying). And processing of the third type is processing which can be executed by either a synchronous MP or an asynchronous MP. Concrete examples of such processing of the third type are the I/O processing of FIG. 8, the changeover processing of FIG. 9, the changeover decision processing of FIG. 12, the processing when adding an MPPK of FIG. 13, the representative changeover decision processing of FIG. 18, the individual changeover decision processing of FIG. 19, the processing for transmitting management screen information like that shown in FIGS. 20 through 23 to the management console 20, the processing for updating the MP utilization rate setting table 250 in a timely manner, and the like. It would also be acceptable for at least one of these processes of the third type, for example the changeover decision processing of FIG. 12, the processing when adding an MPPK of FIG. 13, or the representative changeover decision processing of FIG. 18, to be considered as being asynchronous processing. In concrete terms, for example, it would be acceptable to arrange for either structure change requests or additional provision requests to be received, not by a synchronous MP, but by an asynchronous MP.

Moreover, for example, it would be acceptable for each of the MPs 121 which are present in the storage system 10 not necessarily to be either a synchronous MP or an asynchronous MP. To put this in another manner, it would be acceptable for at least one MP to be included among the plurality of MPs 121 which are present within the storage system 10, which is neither a synchronous MP nor an asynchronous MP (hereinafter this will be termed an MP of the third type). Such an MP of the third type might also be, for example, the representative MP. Moreover, it would also be acceptable for such an MP of the third type to be an MP which executes neither synchronous processing nor asynchronous processing, but rather executes only processing of some third type.

Furthermore, for example, an additionally provided MP need not be additionally provided as a synchronous MR For example if, at the time of such additional provision, a utilization rate relating to the asynchronous MPs (for example, the average utilization rate for the asynchronous MPs) greatly exceeds some utilization rate threshold value, then it would be acceptable for this additionally provided MP to be provided as an asynchronous MP.

Furthermore, it would also be acceptable for there to be two types of utilization rate threshold value, one for the synchronous MPs and one for the asynchronous MPs, or for there to be more types thereof than two.

The invention claimed is:

1. A storage system, comprising:
a plurality of storage devices which are based upon a plurality of logical volumes; and
a controller which receives from an external device an I/O (Input/Output) request designating any one among said plurality of logical volumes;
wherein:
said controller comprises an external interface for receiving the I/O request from said external device, a cache memory for temporarily storing write data included in the I/O request and read data designated by the I/O request, and a plurality of microprocessors;
said plurality of microprocessors comprises one or more first processors and one or more second processors;
each first processor is a microprocessor whose duty is to perform first processing and not to perform second processing;
each second processor is a microprocessor whose duty is to perform the second processing and not to perform the first processing;
said first processing includes, upon said I/O request being received by said external interface, analyzing said I/O request, executing processing corresponding to said I/O request, and returning a response for said I/O request to said external device, the processing corresponding to said I/O request including at least one set of operations selected from:
reading read data designated by said I/O request from said cache memory and sending the read data to said external device,
reading read data designated by said I/O request from any of the storage devices and writing the read data to said cache memory, and
writing write data included in said I/O request to said cache memory; and
said second processing is specific processing, among processing other than said first processing, and includes at least one set of operations selected from:
reading write data from the cache memory and then writing the write data to any of the storage devices,
asynchronous local copy processing, and
asynchronous remote copy processing, and
said first processing is performed by each first processor in parallel with said second processing performed by each second processor,
said controller includes a local memory;
said local memory stores processor type information which includes, for each microprocessor, a processor type value which specifies whether the microprocessor is a first processor or a second processor, and processor utilization rate information which includes a utilization rate for each microprocessor;
at least one microprocessor among said plurality of microprocessors is a representative processor;
the representative processor performs first changeover decision processing periodically or aperiodically, and in the first changeover decision processing, performs processes (D) through (G) described below:
(D) by referring to said processor type information and to said processor utilization rate information, specification of a first utilization rate, which is the utilization rate of a first processor, and a second utilization rate, which is the utilization rate of a second processor;
(E) calculation of a first value on the basis of one or more said first utilization rates which have been specified, and a second value on the basis of one or more said second utilization rates which have been specified;
(F) comparison of said first value which has been calculated with a first threshold value, and, in response to said first value exceeding said first threshold value, updating of the processor type value which corresponds to one of said second processors from a value which denotes an second processor to a value which denotes a first processor; and
(G) comparison of said second value which has been calculated with a second threshold value, and, in response to said second value exceeding said second threshold value, updating of the processor type value which corresponds to one of said first processors from a value which denotes a first processor to a value which denotes a second processor;
some microprocessor among said plurality of microprocessors other than said representative processor performs second changeover decision processing periodically or aperiodically, and in the second changeover decision processing, performs processes (H) through (J) described below:
(H) comparison of the utilization rate of said microprocessor with a third threshold value;
(I) in response to the utilization rate of said microprocessor exceeding said third threshold value and the processor type value which corresponds to said microprocessor denoting a second processor, updating of the processor type value which corresponds to one of said first microprocessors from a value which denotes a first processor to a value which denotes a second processor; and (J) in response to the utilization rate of said microprocessor exceeding said third threshold value and the processor type value which corresponds to said microprocessor denoting a first processor, updating of the processor type value which corresponds to one of said second microprocessors from a value which denotes a second processor to a value which denotes a first processor; and each of the microprocessors performs changeover processing periodically or aperiodically, and in the changeover processing for each microprocessor, in response to the processor type value which corresponds to the microprocessor specifying a processor type which is different from a current processor type of the microprocessor and the first processing or the second processing to be performed by this microprocessor not being completed, the microprocessor performs the non-completed first or second processing.

2. A storage system according to claim 1, wherein:
in response to a change in a number of at least one of said external interface, said storage devices, and said microprocessors, some one microprocessor among said plurality of microprocessors performs processes (A) through (C) described below:

(A) calculation of a first ideal number which is an ideal number of first processors, and a second ideal number which is an ideal number of second processors;

(B) comparison of said first ideal number with a current number of first processors which is ascertained from said processor type information, and, in response to said current number of first processors being less than said first ideal number, updating of the processor type value which corresponds to some one microprocessor of the second processors from a value which denotes a second processor to a value which denotes a first processor;

(C) comparison of said second ideal number with a current number of second processors which is ascertained from said processor type information, and, in response to said current number of second processors being less than said second ideal number, updating of the processor type value which corresponds to some one microprocessor of the first processors from a value which denotes a first processor to a value which denotes a second processor; and where:
said first ideal number is an integer value based upon a value which is calculated by $n[(l/L)/\{(l/L)+(k/M)\}]$;
said second ideal number is an integer value based upon a value which is calculated by $n[(k/M)/\{(l/L)+(k/M)\}]$; and:
n is the number of microprocessors;
l is the number of external interfaces;
L is a maximum number of external interfaces;
k is calculated by an equation which includes a value of m, and increases in response to the value of m increasing;
m is the number of storage devices; and
M is a maximum number of storage devices.

3. A storage system according to claim 2, wherein:
each logical volume constitutes the basis of a RAID group which consists of two or more storage devices;
apart from m, k includes each value s which corresponds to various RAID levels, and increases if the value of s which corresponds to any particular RAID level increases;
s is the number of RAID groups or the number of storage devices;
s is a coefficient set as appropriate; and
the coefficients for a RAID group number of a RAID level for which the number of accesses to said storage device is larger, is larger than the coefficient for a RAID group number of a RAID level for which the number of accesses to said storage device is smaller.

4. A storage system according to claim 2, wherein:
apart from m, k includes a value p and increases if the value of p increases;
p is the number of volume pairs, or the number of logical volumes which are elements in volume pairs, or the number of storage devices which constitute the basis for volume pairs; and
one of the microprocessors performs copying of data between logical volumes which constitute a volume pair.

5. A storage system according to claim 2, wherein:
apart from m, k includes a value q and decreases if the value of q increases;
q is the number of logical volumes which correspond to a cache resident function, or the number of storage devices which constitute a basis for those logical volumes;
the data within logical volumes which correspond to the cache resident function is resident within said cache memory;
any one of the microprocessors performs reading and writing of data according to an I/O request which designates said logical volume, from or into said cache memory; and
the number of accesses to a storage device which constitutes the basis of a logical volume corresponding to the cache resident function, is smaller than the number of accesses to a storage device which constitutes the basis of a logical volume which does not correspond to the cache resident function.

6. A storage system according to claim 1, wherein one among said plurality of microprocessors changes the type of one of said processors from being a first processor to being a second processor, or from being an a second processor to being a first processor, according to circumstances related to at least one of said external interface and said storage devices.

7. A storage system according to claim 6, wherein:
a number of external interfaces and a number of storage devices are included in said circumstances related to at least one of said external interface and said storage devices;
when the number of external interfaces increases, a ratio of a number of first processors to a number of said plurality of microprocessors increases; and
when the number of storage devices increases, a ratio of a number of second processors to a number of said plurality of microprocessors increases.

8. A storage system according to claim 6, wherein:
each logical volume constitutes a basis of a RAID group which consists of two or more storage devices;
how many RAID groups or storage devices are present at what RAID level is included in said circumstances related to at least one of said external interface and said storage devices; and a ratio of second processors increases, at whatever RAID level a number of RAID groups or storage devices increases.

9. A storage system according to claim 8, wherein:
a coefficient is provided for the number of RAID groups or storage devices corresponding to a RAID level; and
the coefficient for a RAID group number or a storage device of a RAID level for which the number of accesses to said storage device is larger, is larger than the coefficient for a RAID group number or a storage device of a RAID level for which the number of accesses to said storage device is smaller.

10. A storage system according to claim 6, wherein:
how many logical volumes or storage devices correspond to what functions are included in said circumstances related to at least one of said external interface and said storage devices;
a ratio of second processors increases in response to a number of logical volumes or storage devices, corresponding to functions for which a number of times of access becomes larger than accesses to logical volumes according to I/O requests, increasing; and
a ratio of first processors increases in response to a number of logical volumes or storage devices, corresponding to functions for which a number of times of access becomes smaller than accesses to logical volumes according to I/O requests, increasing.

11. A storage system according to claim 1, wherein one among said plurality of microprocessors changes the type of one of said processors from being a first processor to being a second processor, or from being an a second processor to being a first processor, according to a load upon at least one microprocessor.

12. A storage system according to claim 11, wherein:
one of said plurality of microprocessors calculates a first value based upon at least one first load, which is a load upon one or more first processors, and a second value based upon at least one second load, which is a load upon one or more second processors, and changes the type of one of the microprocessors from first processor to second processor, or from second processor to first processor, according to said first value and said second value; and
each microprocessor changes the type of one of said microprocessors from first processor to second processor, or from second processor to first processor, according to the load upon that microprocessor itself.

13. A storage system according to claim 1, wherein said plurality of microprocessors further comprises one or more third processors, each third processor is a microprocessor having a duty to perform third processing and not to perform either of the first processing and the second processing, said third processing is different than either of the first processing and the second processing, and said third processing is performed by each third processor in parallel with the first processing and the second processing.

14. A storage system according to claim 1, wherein each first processor or each second processor further performs third processing that is different than either of the first processing and the second processing, and said third processing is performed in parallel with the first processing and the second processing.

15. A method for allotment of processing in a storage system, the storage system including a plurality of storage devices that are based upon a plurality of logical volumes, one or more external interfaces for receiving an I/O request designating any one of said plurality of logical volumes from an external device, a cache memory for temporarily storing write data included in said I/O request or read data designated by said I/O request, and a plurality of microprocessors, the method comprising:
setting one or more microprocessors among said plurality of microprocessors as a first processor and setting one or more other microprocessors as a second processor, wherein:
the first processor executes first processing that includes, upon said I/O request being received by said external interface, analyzing said I/0 request, executing processing corresponding to said I/O request, and returning a response for said I/O request to said external device, the processing corresponding to said I/O request including at least one set of operations selected from:
reading read data designated by said I/O request from said cache memory and sending the read data to said external device,
reading read data designated by said I/O request from any of the storage devices and writing the read data to said cache memory, and
writing write data included in said I/O request to said cache memory; and
the second processor executes second processing that is specific processing, among processing other than said first processing, and includes at least one set of operations selected from:
reading write data from the cache memory and then writing the write data to any of the storage devices,
asynchronous local copy processing, and
asynchronous remote copy processing;
executing said first processing by the first processor in parallel with execution of said second processing by the second processor;
specifying circumstances related to at least one of an external interface, a storage device, and a microprocessor; and
according to said specified circumstances, changing a type of any one of the plurality of microprocessors from being a first processor to being a second processor, or from being a second processor to being a first processor, and wherein
said storage system includes a controller having a local memory;
said local memory stores processor type information which includes, for each microprocessor, a processor type value which specifies whether the microprocessor is a first processor or a second processor, and processor utilization rate information which includes a utilization rate for each microprocessor;
at least one microprocessor among said plurality of microprocessors is a representative processor;
the representative processor performs first changeover decision processing periodically or aperiodically, and in the first changeover decision processing, performs processes (D) through (G) described below:
(D) by referring to said processor type information and to said processor utilization rate information, specification of a first utilization rate, which is the utilization rate of a first processor, and a second utilization rate, which is the utilization rate of a second processor;
(E) calculation of a first value on the basis of one or more said first utilization rates which have been specified, and a second value on the basis of one or more said second utilization rates which have been specified;
(F) comparison of said first value which has been calculated with a first threshold value, and, in response to said first value exceeding said first threshold value, updating of the processor type value which corresponds to one of said second processors from a value which denotes an second processor to a value which denotes a first processor; and (G) comparison of said second value which has been calculated with a second threshold value, and, in response to said second value exceeding said second threshold value, updating of the processor type value which corresponds to one of said first processors from a value which denotes a first processor to a value which denotes a second processor;

some microprocessor among said plurality of microprocessors other than said representative processor performs second changeover decision processing periodically or aperiodically, and in the second changeover decision processing, performs processes (H) through (J) described below:

(H) comparison of the utilization rate of said microprocessor with a third threshold value;

(I) in response to the utilization rate of said microprocessor exceeding said third threshold value and the processor type value which corresponds to said microprocessor denoting a second processor, updating of the processor type value which corresponds to one of said first microprocessors from a value which denotes a first processor to a value which denotes a second processor; and (J) in response to the utilization rate of said microprocessor exceeding said third threshold value and the processor type value which corresponds to said microprocessor denoting a first processor, updating of the processor type value which corresponds to one of said second microprocessors from a value which denotes a second processor to a value which denotes a first processor; and each of the microprocessors performs changeover processing periodically or aperiodically, and in the changeover processing for each microprocessor, in response to the processor type value which corresponds to the microprocessor specifying a processor type which is different from a current processor type of the microprocessor and the first processing or the second processing to be performed by this microprocessor not being completed, the microprocessor performs the non-completed first or second processing.

* * * * *